United States Patent
Taherzadeh Boroujeni et al.

(10) Patent No.: US 11,528,735 B2
(45) Date of Patent: Dec. 13, 2022

(54) REPETITION OF DOWNLINK CONTROL CHANNELS BASED ON UPLINK MESSAGES

(71) Applicant: QUALCOMM Incorporated, San Diego, CA (US)

(72) Inventors: Mahmoud Taherzadeh Boroujeni, San Diego, CA (US); Tao Luo, San Diego, CA (US); Jelena Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 226 days.

(21) Appl. No.: 17/114,175

(22) Filed: Dec. 7, 2020

(65) Prior Publication Data

US 2022/0183042 A1 Jun. 9, 2022

(51) Int. Cl.
| | |
|---|---|
| *H04W 72/12* | (2009.01) |
| *H04W 76/28* | (2018.01) |
| *H04W 76/27* | (2018.01) |
| *H04L 1/18* | (2006.01) |
| *H04L 5/00* | (2006.01) |
| *H04W 72/04* | (2009.01) |

(52) U.S. Cl.
CPC ....... *H04W 72/1284* (2013.01); *H04L 1/1809* (2013.01); *H04L 5/0098* (2013.01); *H04W 72/042* (2013.01); *H04W 76/27* (2018.02); *H04W 76/28* (2018.02)

(58) Field of Classification Search
CPC ........... H04W 72/1284; H04W 72/042; H04W 76/27; H04W 76/28; H04L 1/1809; H04L 5/0098; H04L 1/0026; H04L 1/1671; H04L 1/1896; H04L 1/08; H04L 5/0053; H04L 5/0094; H04L 5/0051

See application file for complete search history.

(56) References Cited

U.S. PATENT DOCUMENTS

2022/0183042 A1* 6/2022 Taherzadeh Boroujeni ................ H04W 76/27

OTHER PUBLICATIONS

Interdigital Inc: "Coverage Enhancements for Initial Access", 3GPP Draft, 3GPP TSG RAN WG1 #102-e, R1-2008485, 3rd Generation Partnership Project (3GPP), Mobile Competence Centre, 650, Route Des Lucioles, F-06921 Sophia-Antipolis Cedex, France, vol. RAN WG1, No. e-Meeting, Oct. 26, 2020-Nov. 13, 2020 Oct. 16, 2020 (Oct. 16, 2020), XP051940171, 5 Pages, Retrieved from the Internet: URL: https://ftp.3gpp.org/tsg_ran/WG1_RL1/TSGR1_103-e/Docs/R1-2008485.zipR1-2008485_103e_COVE_AI8823_InitialAccess_SUBMIT.docx [retrieved on Oct. 16, 2020] Sec.3.

(Continued)

*Primary Examiner* — Kyaw Z Soe
(74) *Attorney, Agent, or Firm* — Loza & Loza, LLP/Qualcomm

(57) ABSTRACT

The aspects described herein may enable a base station to repeat a downlink control channel based on one or more indications received from a user equipment (UE). This may allow the base station to efficiently use network resources to enhance coverage of downlink control channels for different steps of a network access procedure as needed by a UE. For example, a UE may determine to activate or deactivate repetition of a downlink control channel associated with a network access procedure. The UE may transmit an indication configured to activate or deactivate repetition of the downlink control channel.

30 Claims, 14 Drawing Sheets

(56) References Cited

OTHER PUBLICATIONS

International Search Report and Written Opinion—PCT/US2021/061655—ISA/EPO—dated Mar. 25, 2022.
Moderator (ZTE Corporation): "Feature Lead Summary#2 on Coverage Enhancement for Channels Other Than PUSCH and PUCCH", 3GPP Draft, 3GPP TSG RAN WG1 #103-e, R1-2009805, 3rd Generation Partnership Project (3GPP), Mobile Competence Centre, 650, Route Des Lucioles, F-06921 Sophia-Antipolis Cedex, France, vol. RAN WG1, No. e-Meeting, Oct. 26, 2020- Nov. 13, 2020 Nov. 19, 2020 (Nov. 19, 2020), XP051955961, 119 Pages, Retrieved from the Internet: URL: https://ftp.3gpp.org/tsg_ran/WG1_RL1/TSGR1_103-e/Docs/R1-2009805.zip R1-2009805 Feature Lead Summary#2 on Coverage Enhancement for Channels other than PUSCH and PUCCH.docx [retrieved on Nov. 19, 2020] the whole document.
ZTE Corporation: "Discussion on Potential Techniques for Channels other than PUSCH and PUCCH", 3GPP Draft, 3GPP TSG RAN WG1 #103-e, R1-2007745, 3rd Generation Partnership Project (3GPP), Mobile Competence Centre, 650, Route Des Lucioles, F-06921 Sophia-Antipolis Cedex, France, vol. RAN WG1, No. e-Meeting, Oct. 26, 2020- Nov. 13, 2020 Oct. 17, 2020 (Oct. 17, 2020), XP051939885, 14 Pages, Retrieved from the Internet: URL: https://ftp.3gpp.org/tsg_ran/WG1_RL1/TSGR1_103-e/Docs/R1-2007745.zip R1-2007745 Discussion on Potential Techniques for Channels other than PUSCH and PUCCH.docx [retrieved on Oct. 17, 2020] the whole document.

\* cited by examiner

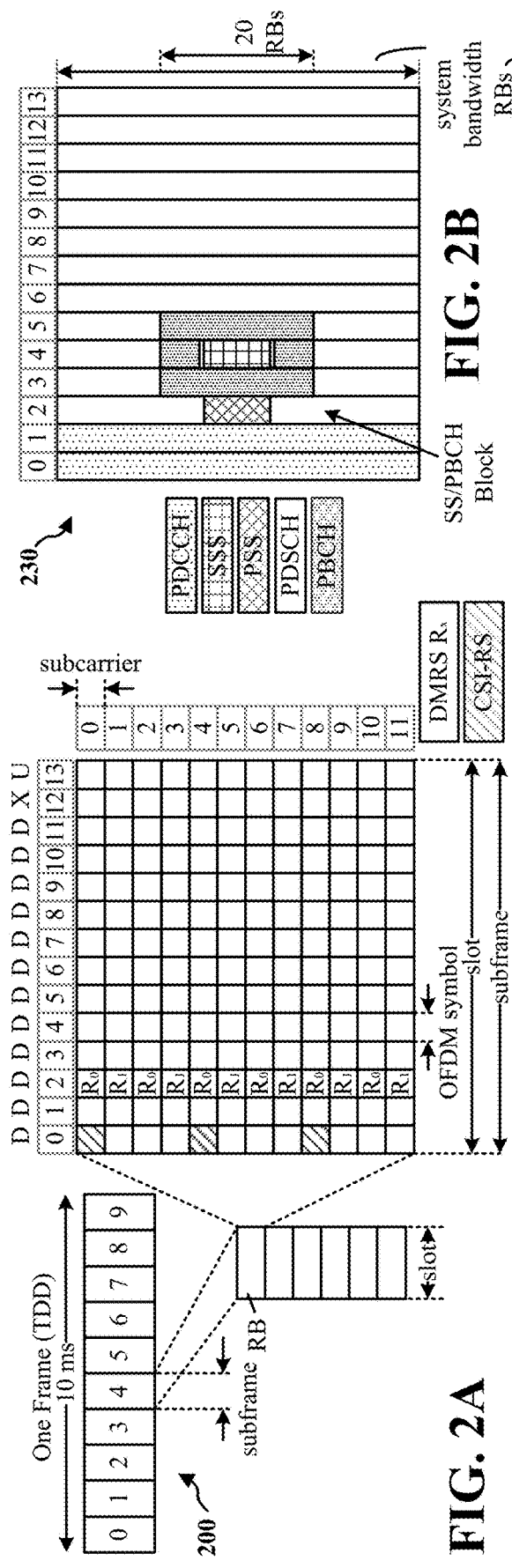
FIG. 2A
FIG. 2B
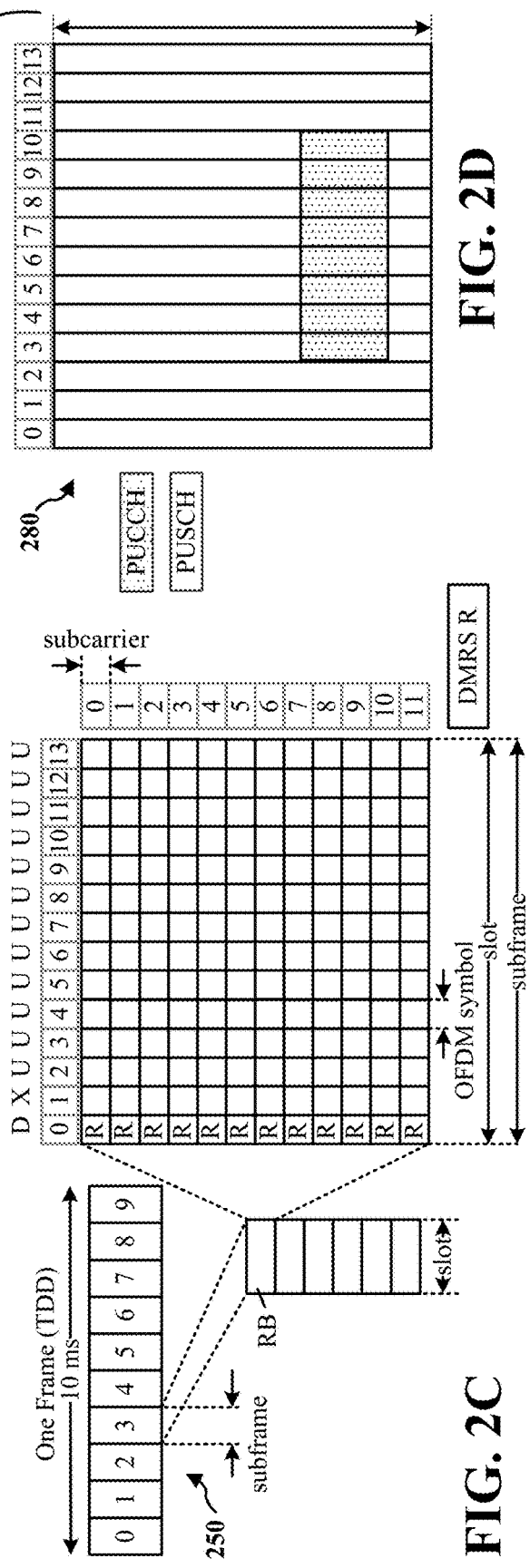
FIG. 2C
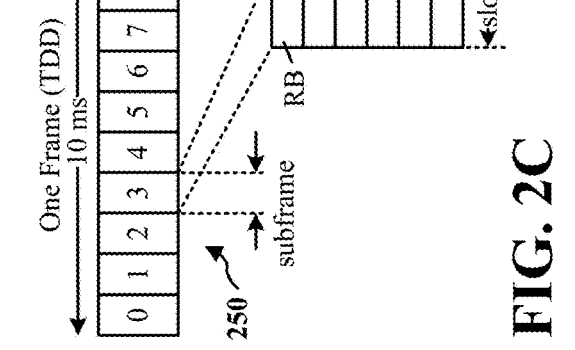
FIG. 2D

REPETITION OF DOWNLINK CONTROL CHANNELS BASED ON UPLINK MESSAGES

BACKGROUND

Technical Field

The present disclosure relates generally to communication systems, and more particularly, to repetition of downlink control channels based on uplink (UL) messages.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

A base station may repeat a downlink (DL) control channel for a message (e.g., a message to a user equipment (UE) on a physical downlink shared channel (PDSCH)) to enhance coverage in a cell. For example, the DL control channel may be associated with a message for a network access procedure. Depending on network conditions and/or other factors, however, downlink control channels for some messages may need less repetition than downlink control channels for other messages. The aspects described herein may enable a base station to selectively repeat a downlink control channel based on one or more indications received from a UE. This may allow the base station to efficiently use network resources to enhance coverage of downlink control channels for different stages of a network access procedure as needed by a UE.

In an aspect of the disclosure, a method, a computer-readable medium, and an apparatus are provided. The apparatus determines to activate or deactivate repetition of a downlink control channel associated with a network access procedure. The apparatus transmits an indication configured to activate or deactivate repetition of the downlink control channel.

In an aspect of the disclosure, a method, a computer-readable medium, and an apparatus are provided. The apparatus receives, from a user equipment (UE), an indication configured to activate or deactivate repetition of the downlink control channel associated with a network access procedure. The apparatus repeats the downlink control channel or not repeating the downlink control channel based on the indication.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
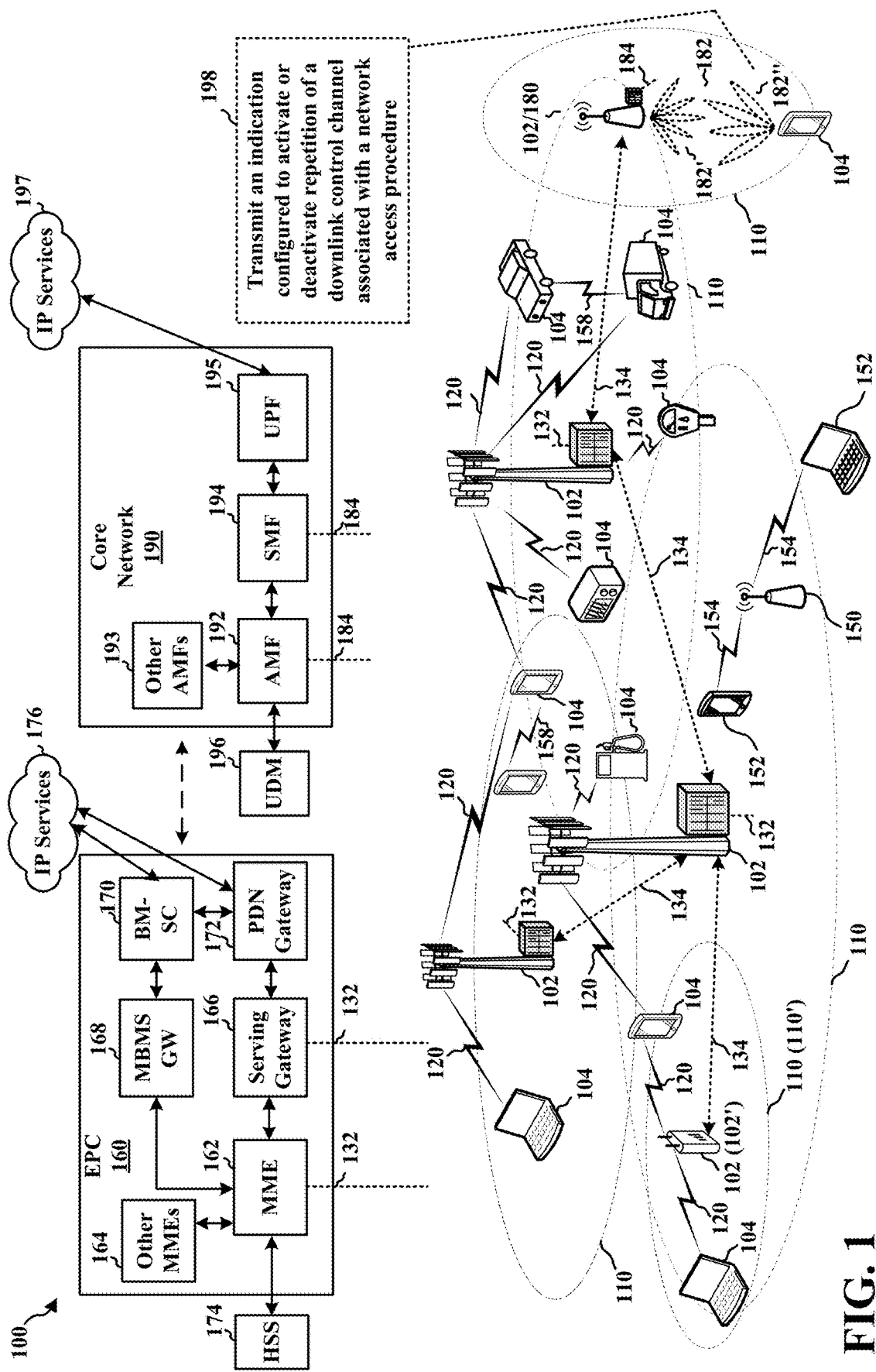
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EE-PROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL).

The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "sub 6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band which is identified by the International Telecommunications Union (ITU) as a "millimeter wave" band. EHF is part of the RF in the electromagnetic spectrum. EHF has a range of 30 GHz to 300 GHz and a wavelength between 1 millimeter and 10 millimeters.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4-a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub 6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in mmW frequencies, and/or near mmW frequencies in communication with the UE 104. When the gNB 180 operates in mmW or near mmW frequencies, the gNB 180 may be referred to as an mmW base station. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to transmit an indication configured to activate or deactivate repetition of a downlink control channel associated with a network access procedure (198). Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kKz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
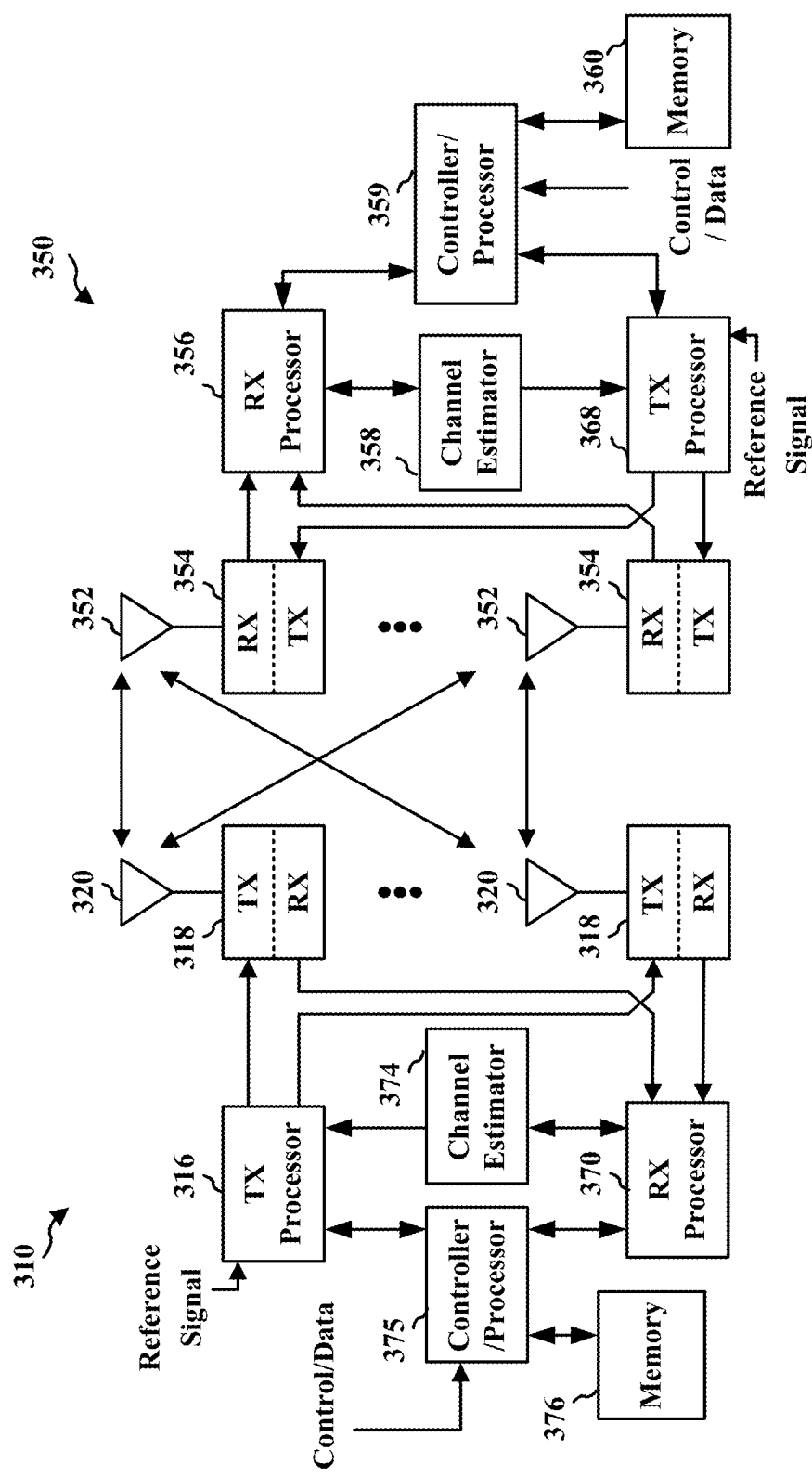
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

Figure 4:
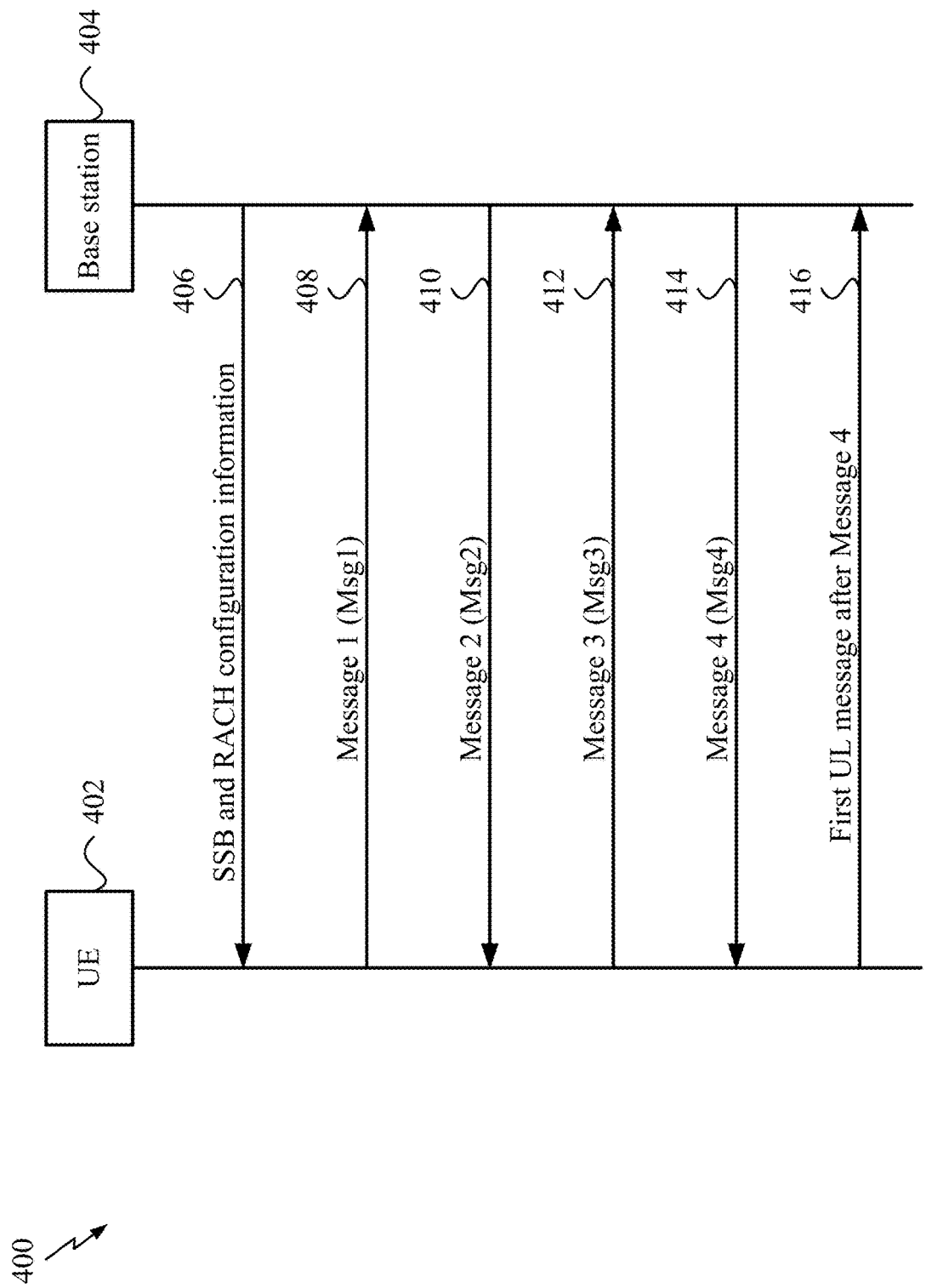
FIG. 4 is a signal flow diagram illustrating an example network access procedure performed between a UE and a base station.

FIG. 4 is a signal flow diagram illustrating an example network access procedure 400 performed between a UE (e.g., UE 402) and a base station (e.g., base station 404). The network access procedure 400 may be a 4-step random access (RA) procedure and may be initiated by the UE 402 for initial access to the network (e.g., to achieve UL synchronization with the base station 404). As shown in FIG. 4, the UE 402 may receive cell detection information 406 from the base station 404. In some aspects of the disclosure, the cell detection information 406 may include a synchronization signal (SS)/PBCH block (SSB) and random access channel (RACH) configuration information.

The UE 402 may initiate the network access procedure 400 by transmitting a PRACH preamble in message 1 (Msg1) 408. Upon detection of the PRACH preamble, the base station 404 may transmit a message 2 (Msg2) 410 including a random access response (RAR). The base station 404 may use a PDCCH for scheduling and a PDSCH for transmitting the message 2 410. The RAR in the message 2 (Msg2) 410 may include a UL grant for the UE 402. The UE 402 may use the UL grant to transmit a message 3 (Msg3) 412 including a radio resource control (RRC) connection request on the PUSCH. The base station 404 may transmit a contention resolution via the message 4 (Msg4) 414 using the PDCCH for scheduling and the PDSCH for transmitting the message 4 414. The UE 402 may transmit an uplink (UL) message 416 (e.g., on PUSCH) after receiving the message 4 (Msg4) 414.

A base station may transmit a downlink (DL) control channel, such as a broadcast PDCCH, during one or more steps of a network access procedure, such as the previously described 4-step random access procedure in FIG. 4. For example, a base station may transmit a broadcast PDCCH for remaining minimum system information (RMSI), a broadcast PDCCH for message 2 (Msg2) 410, and/or a broadcast PDCCH for message 4 (Msg4) 414. In some scenarios, a downlink (DL) control channel may need coverage enhancement in 5G NR (e.g., in FR2). A base station may achieve such coverage enhancement by repeating the DL control channel.

Broadcast PDCCHs for some messages, however, may need less repetition (e.g., due to an additional enhancement or required resources) than broadcast PDCCHs for other messages. The aspects described herein may enable a base station to selectively repeat a downlink (DL) control channel associated with a network access procedure based on one or more indications received from a UE. This may allow the base station to efficiently use network resources to enhance coverage of broadcast PDCCHs for different steps of a network access procedure as needed by a UE.

The term "broadcast PDCCH" as used herein may refer to a PDCCH transmitted from a base station to a UE before an RRC connection is established with the UE. A broadcast PDCCH from a base station may be intended for the UE that transmitted a physical random access channel (PRACH) preamble. For example, a PDCCH transmitted to a UE (e.g., the UE 402) from a base station (e.g., the base station 4040) during a network access procedure (e.g., the previously described 4-step random access procedure in FIG. 4) may be considered a broadcast PDCCH.

Figure 5:
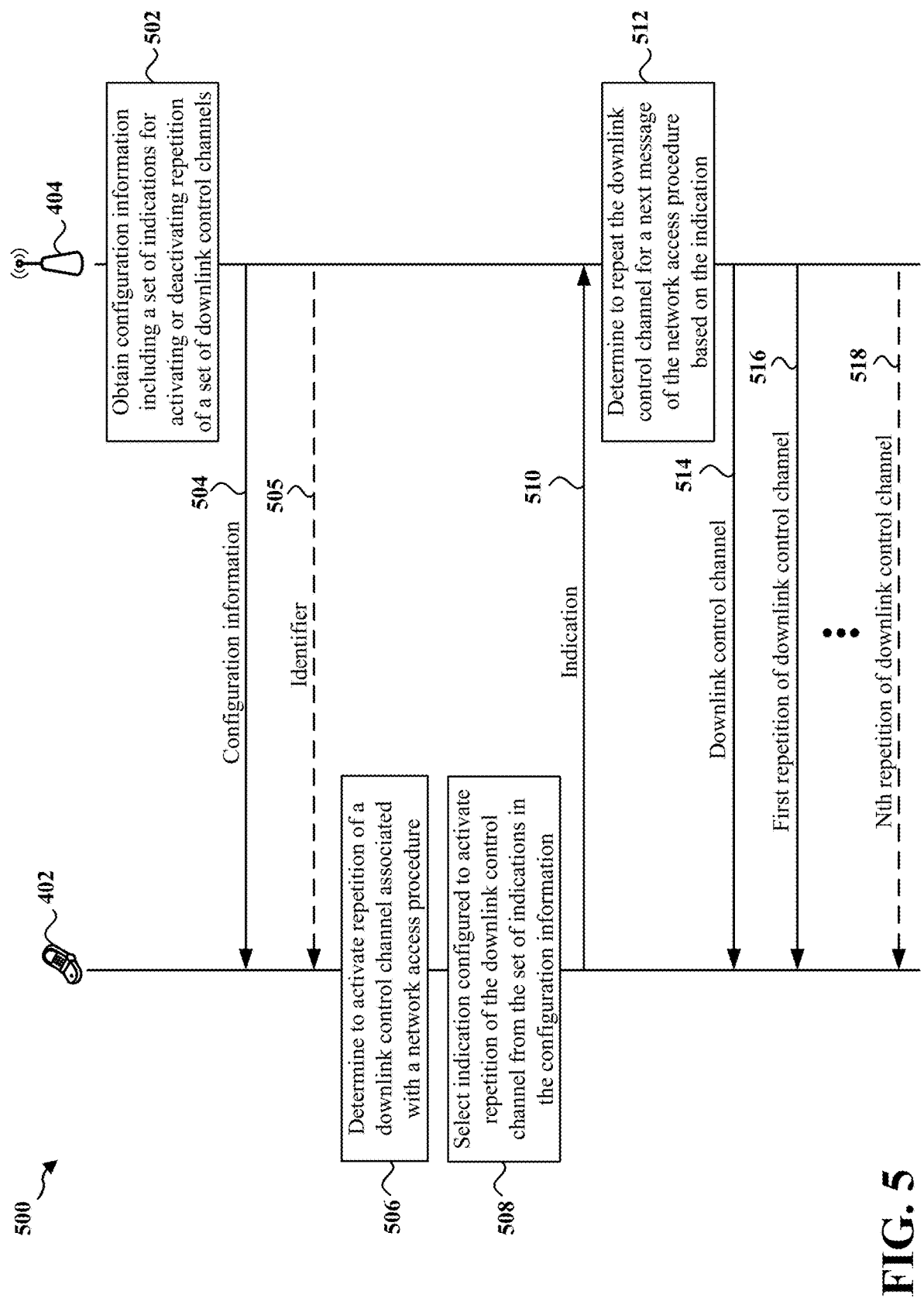
FIG. 5 is a signal flow diagram illustrating repetition of a downlink control channel associated with a network access procedure based on an uplink message in accordance with various aspects of the disclosure.

FIG. 5 is a signal flow diagram illustrating repetition of a downlink control channel associated with a network access procedure based on an uplink message in accordance with various aspects of the disclosure. At 502, the base station 404 may obtain configuration information including a set of indications for activating or deactivating repetition of a set of downlink control channels (also referred to as a set of repeatable downlink control channels). In some examples, the set of indications may include at least one indication for each different downlink control channel in the set of downlink control channels. In some aspects of the disclosure, the set of downlink control channels may be associated with a network access procedure (e.g., the previously described 4-step random access procedure in FIG. 4) that may be performed with the UE 402.

The base station 404 may be configured to repeat a downlink control channel m times, where m is a positive integer. In some aspects of the disclosure, the base station may determine the value of m from either a standard specification being implemented by the base station 404, system information provided to the base station 404, an indication for activating repetition of the downlink control channel received from the UE 402, or from a previously received message. In some aspects of the disclosure, when repetition of a downlink control channel is activated, the base station 404 may repeat the same downlink control channel (e.g., the same PDCCH) over multiple monitoring occasions of the downlink control channel (e.g., over multiple monitoring occasions of the PDCCH).

In some examples, the set of downlink control channels that may be repeated from the base station 404 (e.g., the set of repeatable downlink control channels) may include at least one of a physical downlink control channel (PDCCH) for remaining minimum system information (RMSI), a PDCCH for a random access response message (e.g., message 2 (Msg 2) 410 in FIG. 4), a PDCCH for a retransmission grant of a radio resource connection (RRC) connection setup message, a PDCCH for a contention resolution message (e.g., message 4 (Msg 4) 414 in FIG. 4), or a unicast PDCCH before a channel state information (CSI) report is transmitted from the UE 402.

In some examples, the set of indications may include at least one of a physical random access channel (PRACH) preamble from a preconfigured subset of PRACH preambles, a PRACH preamble repeated over multiple random access channel (RACH) occasions, a PRACH preamble on a predefined subset of RACH occasions, a PRACH preamble using a designated resource allocation (e.g., a resource allocation from a designated set of frequency allocations or resource blocks), a request or a predefined message in a radio resource connection (RRC) connection request message (e.g., message 3 (Msg 3) 412 in FIG. 4), and/or a first uplink transmission after reception of a contention resolution message (e.g., the first UL message 416 after message 4 (Msg4) 414 in FIG. 4).

In one example, the base station 404 may be configured to repeat a PDCCH for a random access response message (e.g., a broadcast PDCCH for message 2 (Msg2) 410) and/or a PDCCH for a retransmission grant of a radio resource connection (RRC) connection setup message (e.g., a broadcast PDCCH for a transmission grant of message 3 (Msg3) 412) when the UE 402 transmits a PRACH preamble (e.g., in the message 1 (Msg1) 408) from a preconfigured subset of PRACH preambles, a PRACH preamble repeated over multiple RACH occasions, a PRACH preamble on a predefined subset of RACH occasions, or a PRACH preamble with a designated resource allocation (e.g., a predefined frequency allocation or a predefined resource block allocation).

In another example, the base station 404 may be configured to repeat a PDCCH for a contention resolution message (e.g., a broadcast PDCCH for message 4 (Msg4) 414) and/or a unicast PDCCH before a channel state information (CSI) report transmission from the UE 402 when the UE 402 includes an explicit request or a predefined message in a radio resource connection (RRC) connection request message (e.g., message 3 (Msg 3) 412 in FIG. 4). In some examples, the base station 404 may be configured to deactivate repetition of the PDCCH for a contention resolution message (e.g., a broadcast PDCCH for message 4 (Msg4) 414) and/or a unicast PDCCH before a channel state information (CSI) report transmission from the UE 402 when the UE 402 includes an implied indication to deactivate repetition of the PDCCH for a contention resolution message. For example, the implied indication may be a beam reporting in the radio resource connection (RRC) connection request message (e.g., a message 3 (Msg 3) 412 in FIG. 4), in which case the base station 404 may deactivate repetition of the PDCCH for a contention resolution message (e.g., a broadcast PDCCH for message 4 (Msg4) 414).

The base station 404 may transmit a message 504 including the configuration information. In some aspects of the disclosure, the base station 404 may optionally transmit a message 505 including an identifier (e.g., a unique k-bit identifier discussed herein with reference to FIG. 6) associated with the configuration information.

The UE 402 may receive the message 504 and may obtain the configuration information from the message 504. At 506, the UE 402 may determine to activate repetition of a downlink control channel associated with a network access procedure. In some aspects of the disclosure, the UE 402 may determine to activate repetition of a downlink control channel based on channel conditions (e.g., based on one or more signal measurements). In one example, the UE 402 may determine to activate repetition of a downlink control channel based on a reference signal received power (RSRP) measurement for an SSB. In this example, the UE 402 may determine to activate repetition of a downlink control channel if the RSRP measurement is less than a threshold. In some examples, the type of signal measurement and/or value of the threshold to be applied by the UE 402 for the determination may be configured by the base station 404 or may be selected by the UE 402.

In another example, the UE 402 may determine to activate repetition of a downlink control channel based on at least one criterion received from the base station 404. For example, during a random access procedure (e.g., the 4-step RA procedure previously described with reference to FIG. 4), the base station 404 may transmit a message 2 (e.g., message 2 (Msg 2) 410 in FIG. 4) that includes at least one criterion (e.g., a type of signal to be measured by the UE 402 and a threshold for that signal) to be applied by the UE 402 when determining to activate repetition for a PDCCH using message 3 (e.g., a message 3 (Msg 3) 412 in FIG. 4).

In some examples, the type of signal measurement and/or value of the threshold to applied by the UE 402 for the determination to activate repetition of a downlink control channel may be configured by the base station 404 (e.g., via system information) or may be selected by the UE 402. In other examples, the UE 402 may use a combination of any of the previously described measurements and thresholds when determining to activate repetition of a downlink control channel. In some examples, the UE 402 may use the type of signal measurement and/or value of the threshold when determining whether to deactivate repetition of a downlink control channel (e.g., in scenarios where the UE 402 may have previously activated repetition of a downlink control channel, but may no longer need any further repetitions of downlink control channels based on current channel measurements).

At 508, the UE 402 may select an indication configured to activate repetition of the downlink control channel from the set of indications in the configuration information. The UE 402 may transmit a message 510 including the selected indication. For example, the message 510 may be the message 1 (Msg1) 408 of the previously described 4-step random access procedure in FIG. 4 and may include a PRACH preamble from a preconfigured subset of PRACH preambles. The base station 404 may be configured to repeat the PDCCH for a next message of a network access procedure (e.g., for the message 2 (Msg2) 410 of the 4-step random access procedure) in response to receiving a PRACH preamble from the preconfigured subset of PRACH preambles.

At 512, the base station 404 may determine to repeat the downlink control channel for a next message of the network access procedure based on the indication. In some aspects of the disclosure, the base station 404 may automatically repeat the downlink control channel for the next message of the network access procedure after receiving the indication in the message 510. In other aspects of the disclosure, the base station 404 may determine whether or not to repeat the downlink control channel for the next message of the network access procedure based on one or more conditions defined by the network.

For example, if the indication in the message 510 includes a PRACH preamble from a preconfigured subset of PRACH preambles, the base station 404 may determine to repeat the PDCCH for the next message of the network access procedure (e.g., for the message 2 (Msg2) 410 of the 4-step random access procedure). Accordingly, the base station 404 may transmit the downlink control channel 514 for the next message of the network access procedure (e.g., for the message 2 (Msg2) 410 of the 4-step random access procedure), followed by a first repetition 516 of the downlink control channel. As shown in FIG. 5, the base station 404 may send up to an Nth repetition 518 of the downlink control channel. In some aspects of the disclosure, the value of N may be predefined in a standard specification being implemented by the base station 404.

In some aspects of the disclosure, if the base station 404 has the option of determining whether or not to repeat the downlink control channel for the next message of the network access procedure after receiving the indication in the message 510, the UE 402 may perform blind decoding to decode the downlink control channel (e.g., to obtain control information in the downlink control channel). In this case, the UE 402 may be expected to perform blind decoding by considering that the downlink control channel may or may not be repeated. For example, the UE 402 may perform a first blind decoding operation for the downlink control channel based on an assumption that the downlink control channel will not be repeated, and may perform a second blind decoding operation for the downlink control channel based on an assumption that the downlink control channel will be repeated.

In some aspects of the disclosure, if the message 510 is the first message of a network access procedure (e.g., message 1 (Msg1) 408 of the 4-step random access procedure in FIG. 4) and includes an indication for activating repetition of a downlink control channel, the base station 404 may repeat the downlink control channels for any of the subsequent messages (e.g., PDCCH for message 2 (Msg2) 410, and PDCCH for message 4 (Msg4) 414) of the network access procedure.

For example, if the indication in the message 510 includes a PRACH preamble from a preconfigured subset of PRACH preambles, the base station 404 may determine to repeat the PDCCH for the next message of the network access procedure (e.g., for the message 2 (Msg2) 410 of the 4-step random access procedure). Accordingly, the base station 404 may transmit the downlink control channel 514 for the next message of the network access procedure (e.g., for the message 2 (Msg2) 410 of the 4-step random access procedure), followed by a first repetition 516 of the downlink control channel. As shown in FIG. 5, the base station 404 may send up to an Nth repetition 518 of the downlink control channel.

Figure 6:
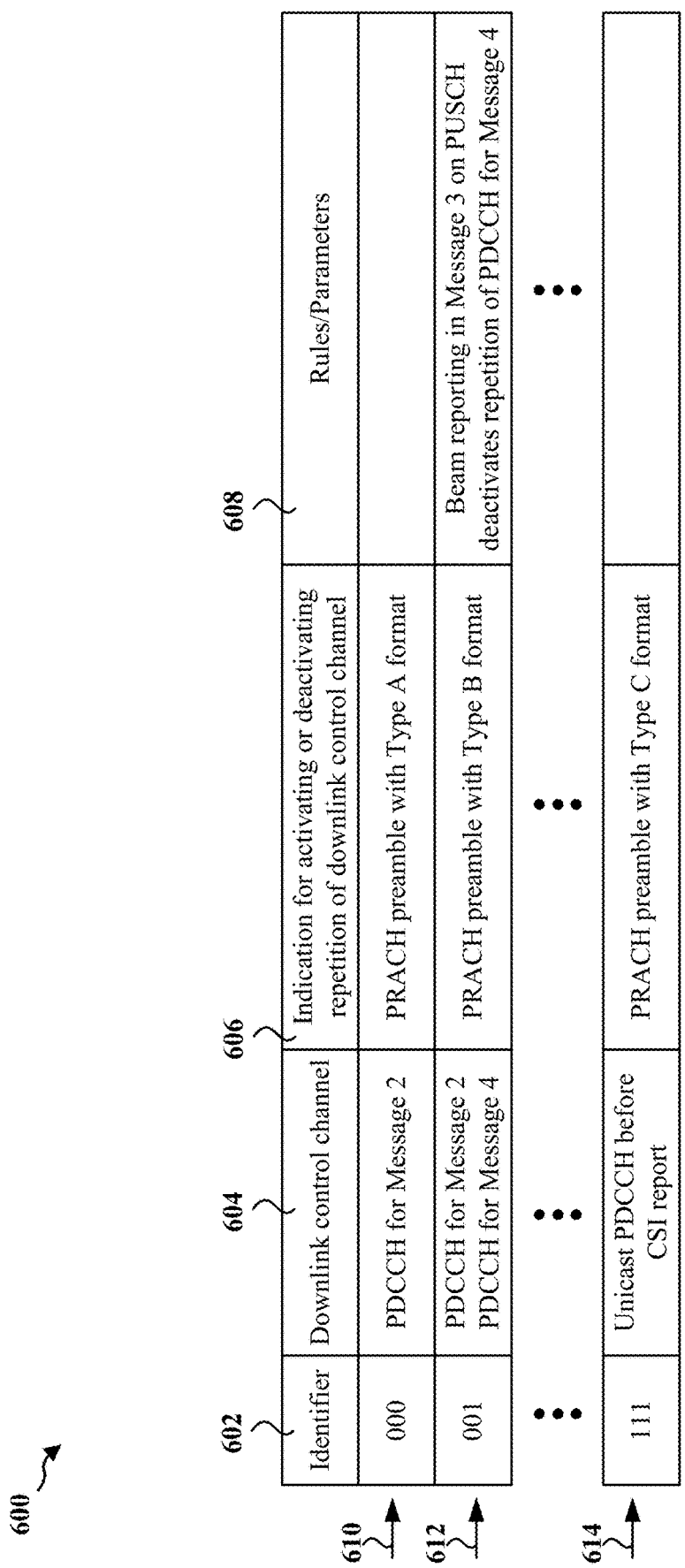
FIG. 6 illustrates an example configuration information table including a row identifier field, a downlink control channel field, an indication field, and a rules and/or parameters field.

In some aspects of the disclosure, the configuration information may be structured in tabular form. For example, FIG. 6 illustrates an example configuration information table 600 including a row identifier field 602, a downlink control channel field 604, an indication field 606, and a rules and/or parameters field 608. In some examples, and as described in detail herein, the configuration information table 600 may describe the indication that the UE 402 may transmit to activate or deactivate repetition of a particular downlink control channel. Moreover, the configuration information table 600 may further describe any additional rules and/or parameters for controlling the repetition of a downlink control channel.

The row identifier field 602 may include a unique k-bit identifier for each row (e.g., first row 610, second row 612, eighth row 614) of the configuration information table 600. In the example of FIG. 6, the k-bit identifier is a 3-bit identifier. In other examples, the k-bit identifier may be less than a 3-bit identifier or greater than a 3-bit identifier.

The downlink control channel field 604 may include downlink control channels that may be repeated by a base station (e.g., the base station 404), where the downlink control channels are associated with a network access procedure. The indication field 606 may include an indication for activating or deactivating repetition of a downlink control channel. The rules/parameters field 608 may include rules and/or parameters that may control the repetition of a downlink control channel.

In one example, the first row 610 of the configuration information table 600 having row identifier '000' may indicate that repetition of the PDCCH for message 2 of a random access procedure (e.g., for the message 2 (Msg2) 410 of the 4-step random access procedure) may be activated by transmitting a PRACH preamble with Type A format.

In another example, the second row 612 of the configuration information table 600 having row identifier '001' may indicate that repetition of the PDCCH for message 2 and the PDCCH for message 4 of a random access procedure (e.g., for message 2 (Msg2) 410 and message 4 (Msg4) 414 of the 4-step random access procedure in FIG. 4) may be activated by transmitting a PRACH preamble with a Type B format. As indicated in the rules/parameters field 608 for row identifier '001', beam reporting from the UE 402 in message 3 on PUSCH may deactivate repetition of the PDCCH for Message 4.

In another example, the eighth row 614 of the configuration information table 600 having row identifier '111' may indicate that repetition of a unicast PDCCH before the UE 402 transmits a CSI report may be activated by transmitting a PRACH preamble with a Type C format.

In some aspects of the disclosure, the base station 404 may transmit a row identifier in RMSI to the UE 402 to indicate which downlink control channels may be repeated (e.g., to indicate a set of repeatable downlink control channels), the indication for activating or deactivating repetition of those downlink control channels, and any rules/parameters for controlling the repetition of those downlink control channels. For example, the base station 404 may transmit the bits '001' (assigned to the second row 612 in the configuration information table 600) to the UE 402 in RMSI. This may inform the UE 402 that transmission of a PRACH preamble with Type B format may serve as an indication for activating repetition of the PDCCH for message 2 and the PDCCH for message 4 of a random access procedure (e.g., for message 2 (Msg2) 410 and message 4 (Msg4) 414 of the 4-step random access procedure in FIG. 4). Moreover, the UE 402 may be aware that beam reporting in message 3 (e.g., in the message 3 (Msg3) 412 of the 4-step random access procedure) on PUSCH deactivates repetition of PDCCH for message 4 (e.g., for the message 4 (Msg4) 414 of the 4-step random access procedure in FIG. 4).

Figure 7:
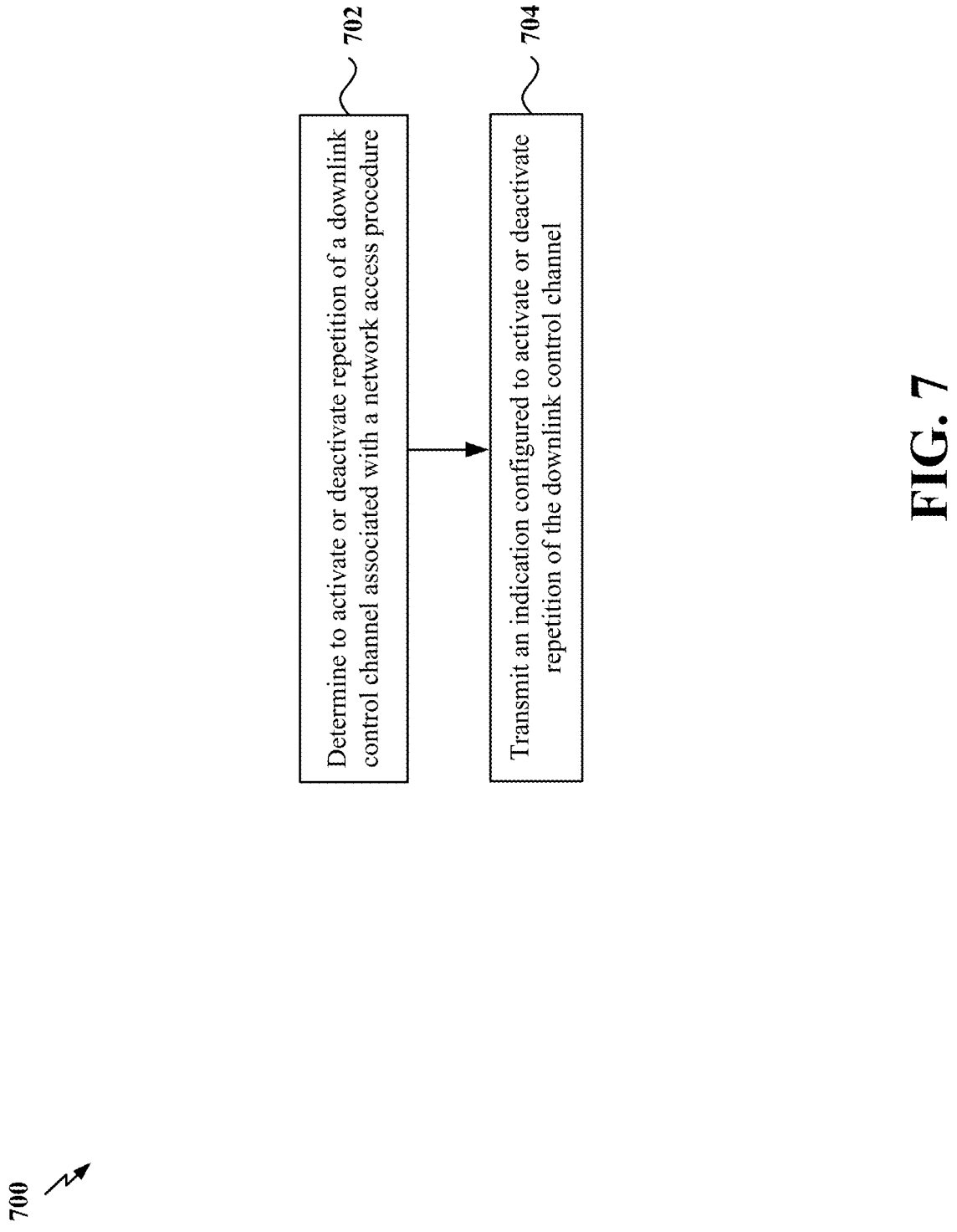
FIG. 7 is a flowchart of a method of wireless communication in accordance with various aspects of the disclosure.

FIG. 7 is a flowchart 700 of a method of wireless communication. The method may be performed by a UE (e.g., the UE 402; the apparatus 902/902'; the processing system 1014, which may include the memory 360 and which may be the entire UE 402 or a component of the UE 402, such as the TX processor 368, the RX processor 356, and/or the controller/processor 359).

At 702, the UE determines to activate or deactivate repetition of a downlink control channel associated with a network access procedure. In some aspects of the disclosure, the UE determines to activate or deactivate repetition of a downlink control channel associated with a network access procedure by obtaining configuration information including a set of repeatable downlink control channels and a set of indications for activating or deactivating repetition of one or more downlink control channels in the set of repeatable downlink control channels. The UE may then select the downlink control channel from the set of repeatable downlink control channels and may select the indication configured to activate or deactivate repetition of the downlink control channel from the set of indications. In some examples, the configuration information may include the configuration information table 600. In some examples, and as described with reference to 506 in FIG. 5, the UE may determine to activate repetition of a downlink control channel based on channel conditions (e.g., based on one or more signal measurements).

In some aspects of the disclosure, the set of repeatable downlink control channels includes at least one of a physical downlink control channel (PDCCH) for remaining minimum system information (RMSI), a physical downlink control channel (PDCCH) for a random access response message, a physical downlink control channel (PDCCH) for a retransmission grant of a radio resource connection (RRC) connection setup message, a physical downlink control channel (PDCCH) for a contention resolution message, or a unicast physical downlink control channel (PDCCH) before a channel state information (CSI) report is transmitted from the UE.

In some aspects of the disclosure, the set of indications includes at least one of a physical random access channel (PRACH) preamble from a preconfigured subset of PRACH preambles, a PRACH preamble repeated over multiple random access channel (RACH) occasions, a PRACH preamble on a predefined subset of RACH occasions, a PRACH preamble using a designated resource allocation, a request or a predefined message in a radio resource connection (RRC) connection request message, or a first uplink transmission after reception of a contention resolution message. For example, the predefined message may include a beam report and may be configured to deactivate repetition of the downlink control channel.

In some aspects of the disclosure, the configuration information may include at least one rule for controlling repetition of the downlink control channel. For example, the at least one rule may be included in a rules and/or parameters field of a configuration information table (e.g., the rules and/or parameters field 608 of the configuration information table 600 described with reference to FIG. 6).

Finally, at 704, the UE transmits an indication configured to activate or deactivate repetition of the downlink control channel. In some aspects of the disclosure, the indication may be configured to activate or deactivate repetition of the downlink control channel for one or more subsequent messages of the network access procedure from the base station. For example, with reference to FIG. 5, if the indication (e.g., in the message 510) from the UE 402 includes a PRACH preamble from a preconfigured subset of PRACH preambles, the base station 404 may determine to repeat the PDCCH for the next message of the network access procedure (e.g., for the message 2 (Msg2) 410 of the 4-step random access procedure). Accordingly, the base station 404 may transmit the downlink control channel 514 for the next message of the network access procedure (e.g., for the message 2 (Msg2) 410 of the 4-step random access procedure), followed by a first repetition 516 of the downlink control channel. As shown in FIG. 5, the base station 404 may send up to an Nth repetition 518 of the downlink control channel. In some aspects of the disclosure, the downlink control channel is automatically repeated for a predefined number of repetitions in response to the transmitted indication.

Figure 8:
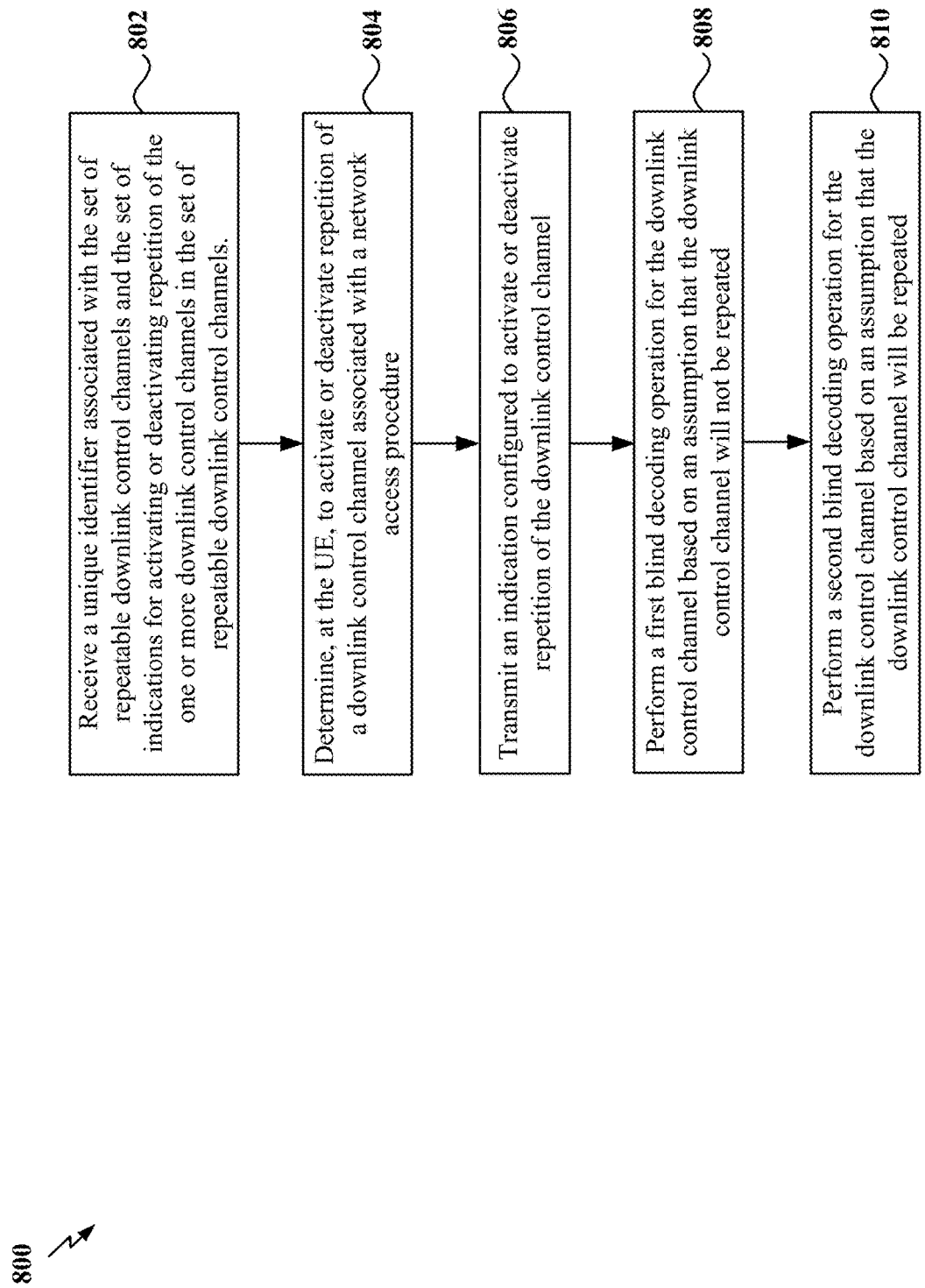
FIG. 8 is a flowchart of a method of wireless communication in accordance with various aspects of the disclosure.

FIG. 8 is a flowchart 800 of a method of wireless communication. The method may be performed by a UE (e.g., the UE 402; the apparatus 902/902'; the processing system 1014, which may include the memory 360 and which may be the entire UE 402 or a component of the UE 402, such as the TX processor 368, the RX processor 356, and/or the controller/processor 359).

At 802, the UE receives a unique identifier associated with a set of repeatable downlink control channels and a set of indications for activating or deactivating repetition of the one or more downlink control channels in the set of repeatable downlink control channels. For example, the unique identifier may be the unique k-bit identifier for each row (e.g., first row 610, second row 612, eighth row 614) of the configuration information table 600.

At 804, the UE determines to activate or deactivate repetition of a downlink control channel associated with a network access procedure. In some aspects of the disclosure, the UE determines to activate or deactivate repetition of a downlink control channel associated with a network access procedure by obtaining configuration information including a set of repeatable downlink control channels and a set of indications for activating or deactivating repetition of one or more downlink control channels in the set of repeatable downlink control channels. The UE may then select the downlink control channel from the set of repeatable downlink control channels and may select the indication configured to activate or deactivate repetition of the downlink control channel from the set of indications. In some examples, the configuration information may include the configuration information table 600. In some examples, and as described with reference to 506 in FIG. 5, the UE may determine to activate repetition of a downlink control channel based on channel conditions (e.g., based on one or more signal measurements).

In some aspects of the disclosure, the set of repeatable downlink control channels includes at least one of a physical downlink control channel (PDCCH) for remaining minimum system information (RMSI), a physical downlink control channel (PDCCH) for a random access response message, a physical downlink control channel (PDCCH) for a retransmission grant of a radio resource connection (RRC) connection setup message, a physical downlink control channel (PDCCH) for a contention resolution message, or a unicast physical downlink control channel (PDCCH) before a channel state information (CSI) report is transmitted from the UE.

In some aspects of the disclosure, the set of indications includes at least one of a physical random access channel (PRACH) preamble from a preconfigured subset of PRACH preambles, a PRACH preamble repeated over multiple random access channel (RACH) occasions, a PRACH preamble on a predefined subset of RACH occasions, a PRACH preamble using a designated resource allocation, a request or a predefined message in a radio resource connection (RRC)

connection request message, or a first uplink transmission after reception of a contention resolution message. For example, the predefined message may include a beam report and may be configured to deactivate repetition of the downlink control channel.

In some aspects of the disclosure, the configuration information may include at least one rule for controlling repetition of the downlink control channel. For example, the at least one rule may be included in a rules and/or parameters field of a configuration information table (e.g., the rules and/or parameters field 608 of the configuration information table 600 described with reference to FIG. 6).

At 806, the UE transmits an indication configured to activate or deactivate repetition of the downlink control channel. In some aspects of the disclosure, the indication may be configured to activate or deactivate repetition of the downlink control channel for one or more subsequent messages of the network access procedure from the base station. For example, with reference to FIG. 5, if the indication (e.g., in the message 510) from the UE 402 includes a PRACH preamble from a preconfigured subset of PRACH preambles, the base station 404 may determine to repeat the PDCCH for the next message of the network access procedure (e.g., for the message 2 (Msg2) 410 of the 4-step random access procedure). Accordingly, the base station 404 may transmit the downlink control channel 514 for the next message of the network access procedure (e.g., for the message 2 (Msg2) 410 of the 4-step random access procedure), followed by a first repetition 516 of the downlink control channel. As shown in FIG. 5, the base station 404 may send up to an Nth repetition 518 of the downlink control channel. In some aspects of the disclosure, the downlink control channel is automatically repeated for a predefined number of repetitions in response to the transmitted indication.

At 808, the UE performs a first blind decoding operation for the downlink control channel based on an assumption that the downlink control channel will not be repeated. The UE may perform the first blind decoding operation to obtain control information included in the downlink control channel.

Finally, at 810, the UE performs a second blind decoding operation for the downlink control channel based on an assumption that the downlink control channel will be repeated. The UE may perform the second blind decoding operation to obtain control information included in the downlink control channel.

Figure 9:
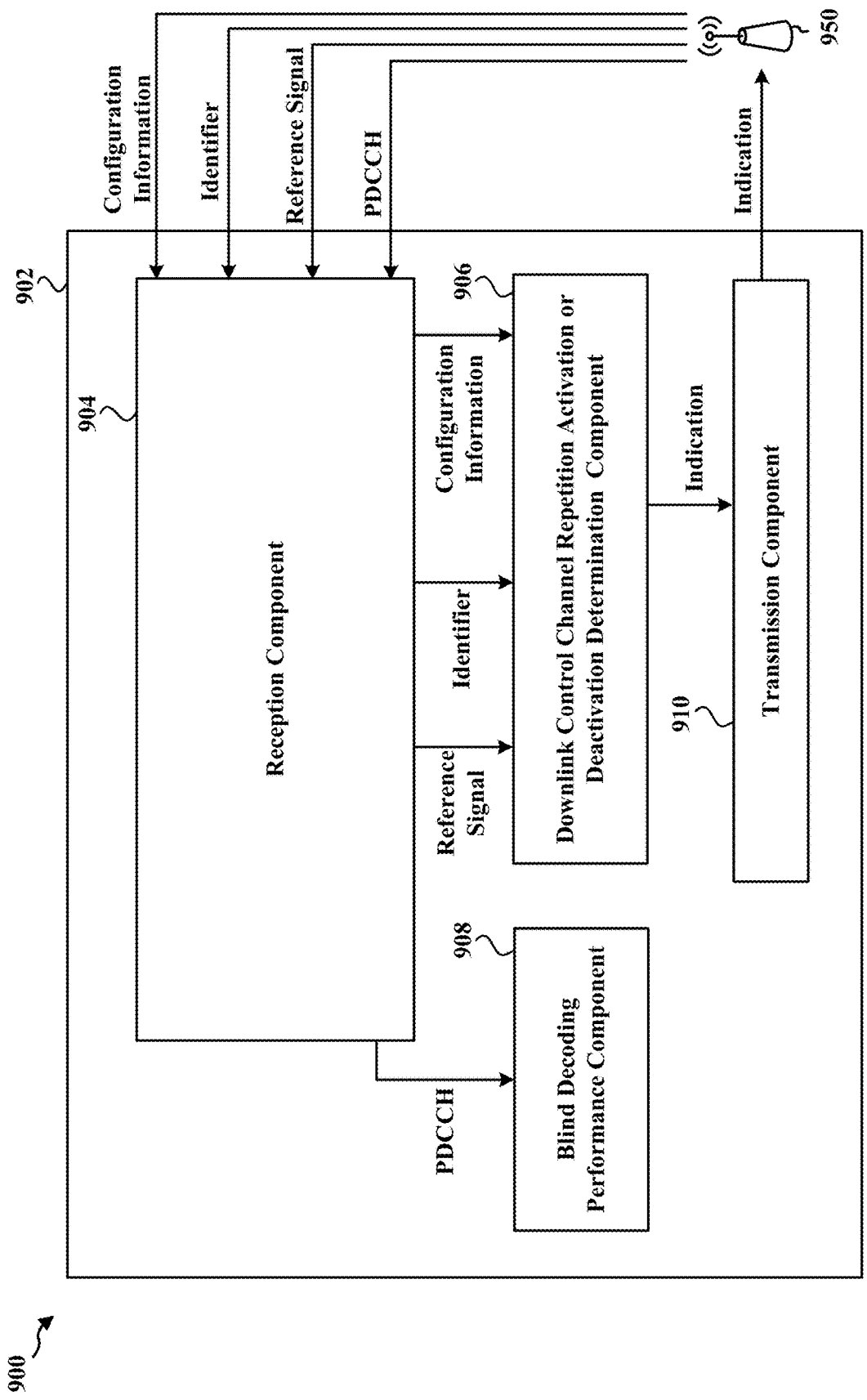
FIG. 9 is a conceptual data flow diagram illustrating the data flow between different means/components in an example apparatus.

FIG. 9 is a conceptual data flow diagram 900 illustrating the data flow between different means/components in an example apparatus 902. The apparatus may be a UE. The apparatus includes a reception component 904 that receives (e.g., from the base station 950) configuration information including a set of repeatable downlink control channels and a set of indications for activating or deactivating repetition of one or more downlink control channels in the set of repeatable downlink control channels. The reception component 904 further receives a unique identifier associated with the set of repeatable downlink control channels and the set of indications for activating or deactivating repetition of the one or more downlink control channels in the set of repeatable downlink control channels. The reception component 904 further receives a reference signal (e.g., a reference signal, such as an SSB, which allows the apparatus to perform a signal measurement, such as a reference signal received power (RSRP) measurement).

The apparatus further includes a downlink control channel repetition activation or deactivation determination component 906 that determines to activate or deactivate repetition of a downlink control channel associated with a network access procedure. In some examples, the downlink control channel repetition activation or deactivation determination component 906 may perform a signal measurement (e.g., an RSRP measurement) and may determine to activate repetition of a downlink control channel based on the signal measurement (e.g., an RSRP measurement). In this example, the UE 402 may determine to activate repetition of a downlink control channel if the RSRP measurement is less than a threshold. In some examples, the type of signal measurement and/or value of the threshold to applied by the UE 402 for the determination may be configured by the base station 404 or may be selected by the UE 402.

In some aspects of the disclosure, the downlink control channel repetition activation or deactivation determination component 906 may be configured to obtain configuration information (e.g., via the reception component 904). The configuration information may include a set of repeatable downlink control channels and a set of indications for activating or deactivating repetition of one or more downlink control channels in the set of repeatable downlink control channels. The downlink control channel repetition activation or deactivation determination component 906 may select the downlink control channel from the set of repeatable downlink control channels, and may select the indication configured to activate or deactivate repetition of the downlink control channel from the set of indications.

The apparatus further includes a blind decoding performance component 908 that performs a first blind decoding operation for the downlink control channel (e.g., PDCCH for a message of a network access procedure) based on an assumption that the downlink control channel will not be repeated, and that performs a second blind decoding operation for the downlink control channel based on an assumption that the downlink control channel will be repeated, and a transmission component 910 that transmits an indication configured to activate or deactivate repetition of the downlink control channel.

The apparatus may include additional components that perform each of the blocks of the algorithm in the aforementioned flowcharts of FIGS. 7 and 8. As such, each block in the aforementioned flowcharts of FIGS. 7 and 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 10:
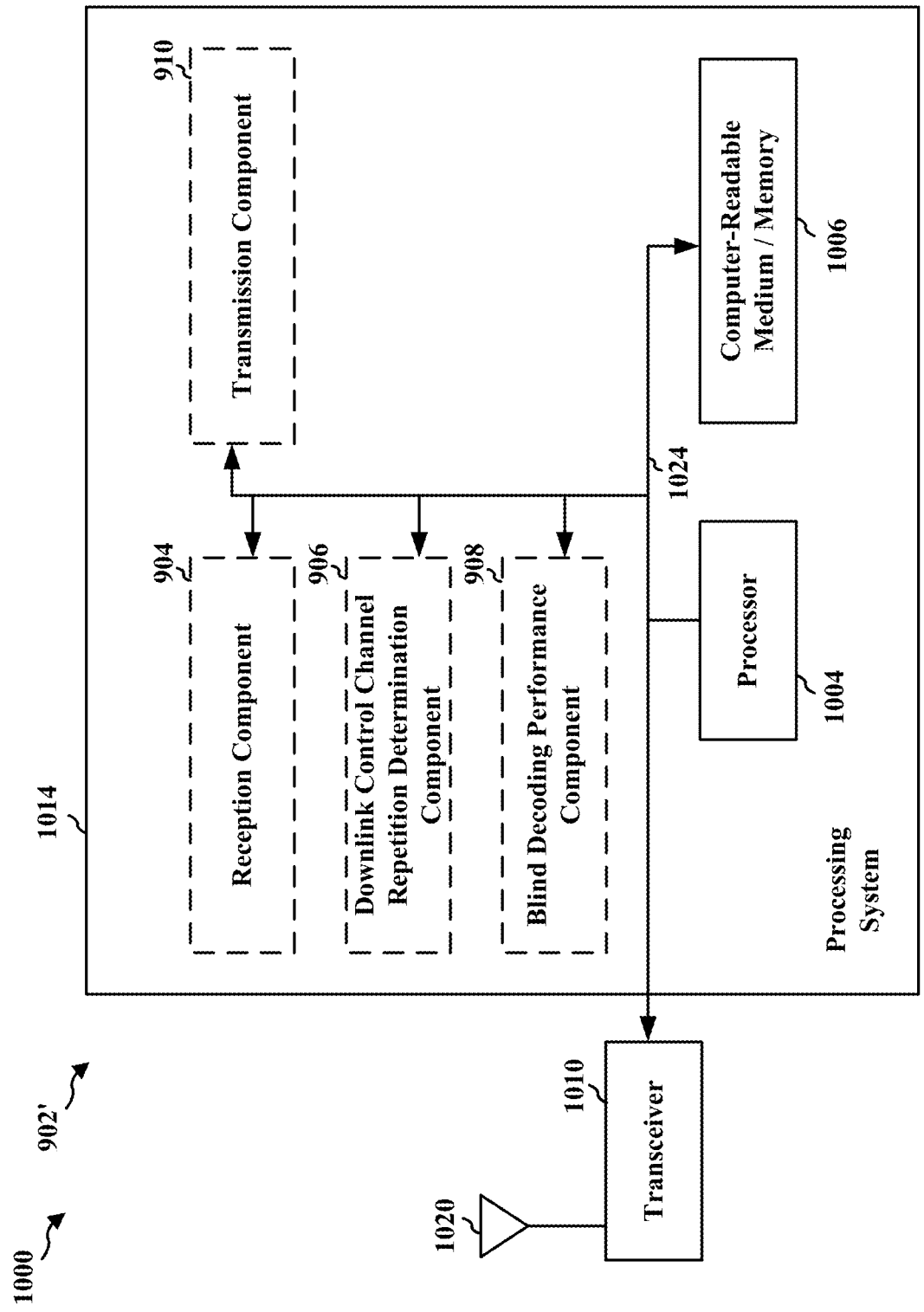
FIG. 10 is a diagram illustrating an example of a hardware implementation for an apparatus employing a processing system.

FIG. 10 is a diagram 1000 illustrating an example of a hardware implementation for an apparatus 902' employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware components, represented by the processor 1004, the components 904, 906, 908, 910 and the computer-readable medium/memory 1006. The bus 1024 may also link various other circuits such as timing sources, peripherals, voltage regulators, and power management circuits, which are well known in the art, and therefore, will not be described any further.

The processing system 1014 may be coupled to a transceiver 1010. The transceiver 1010 is coupled to one or more antennas 1020. The transceiver 1010 provides a means for communicating with various other apparatus over a transmission medium. The transceiver 1010 receives a signal from the one or more antennas 1020, extracts information from the received signal, and provides the extracted information to the processing system 1014, specifically the reception component 904. In addition, the transceiver 1010 receives information from the processing system 1014, specifically the transmission component 910, and based on the received information, generates a signal to be applied to the one or more antennas 1020. The processing system 1014 includes a processor 1004 coupled to a computer-readable medium/memory 1006. The processor 1004 is responsible for general processing, including the execution of software stored on the computer-readable medium/memory 1006. The software, when executed by the processor 1004, causes the processing system 1014 to perform the various functions described supra for any particular apparatus. The computer-readable medium/memory 1006 may also be used for storing data that is manipulated by the processor 1004 when executing software. The processing system 1014 further includes at least one of the components 904, 906, 908, 910. The components may be software components running in the processor 1004, resident/stored in the computer readable medium/memory 1006, one or more hardware components coupled to the processor 1004, or some combination thereof. The processing system 1014 may be a component of the UE 350 and may include the memory 360 and/or at least one of the TX processor 368, the RX processor 356, and the controller/processor 359. Alternatively, the processing system 1014 may be the entire UE (e.g., see 350 of FIG. 3).

In one configuration, the apparatus 902/902' for wireless communication includes means for determining, at the UE, to activate or deactivate repetition of a downlink control channel associated with a network access procedure, means for transmitting an indication configured to activate or deactivate repetition of the downlink control channel, means for receiving a unique identifier associated with the set of repeatable downlink control channels and the set of indications for activating or deactivating repetition of the one or more downlink control channels in the set of repeatable downlink control channels, means for performing a first blind decoding operation for the downlink control channel based on an assumption that the downlink control channel will not be repeated, and means for performing a second blind decoding operation for the downlink control channel based on an assumption that the downlink control channel will be repeated. The aforementioned means may be one or more of the aforementioned components of the apparatus 902 and/or the processing system 1014 of the apparatus 902' configured to perform the functions recited by the aforementioned means. As described supra, the processing system 1014 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 11:
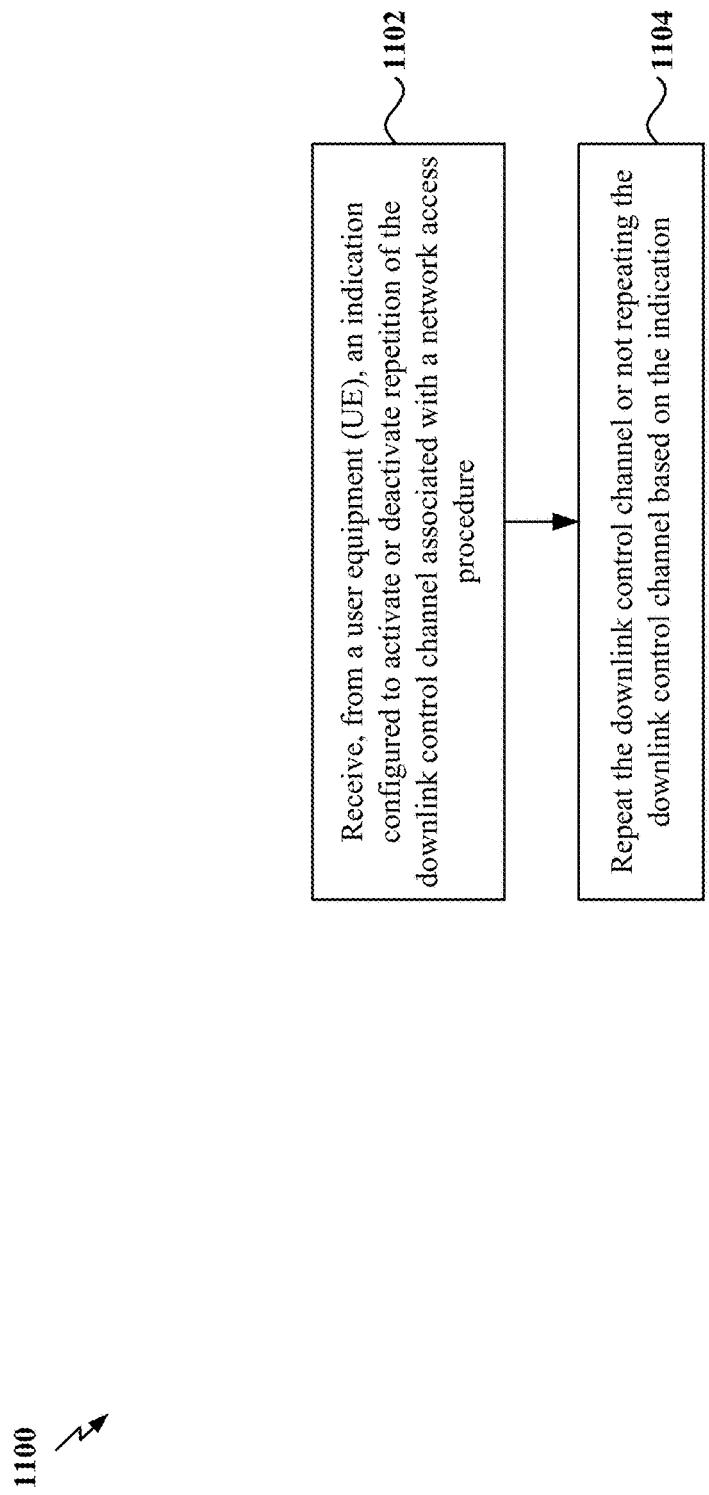
FIG. 11 is a flowchart of a method of wireless communication in accordance with various aspects of the disclosure.

FIG. 11 is a flowchart 1100 of a method of wireless communication. The method may be performed by a base station (e.g., the base station 404; the apparatus 1302/1302'; the processing system 1414, which may include the memory 376 and which may be the entire base station 404 or a component of the base station 404, such as the TX processor 316, the RX processor 370, and/or the controller/processor 375).

At 1102, the base station receives, from a user equipment (UE), an indication configured to activate or deactivate repetition of the downlink control channel associated with a network access procedure. For example, with reference to FIG. 5, the indication received from the UE may be the selected indication included in message 510, and the network access procedure may be the 4-step random access procedure 400 shown in FIG. 4.

In some examples, the indication may be from a set of indications including at least one of a physical random access channel (PRACH) preamble from a preconfigured subset of PRACH preambles, a PRACH preamble repeated over multiple random access channel (RACH) occasions, a PRACH preamble on a predefined subset of RACH occasions, a PRACH preamble using a designated resource allocation, a request or a predefined message in a radio resource connection (RRC) connection request message, or a first uplink transmission after reception of a contention resolution message.

In some examples, the downlink control channel may be from a set of repeatable downlink control channels including at least one of a physical downlink control channel (PDCCH) for remaining minimum system information (RMSI), a physical downlink control channel (PDCCH) for a random access response message, a physical downlink control channel (PDCCH) for a retransmission grant of a radio resource connection (RRC) connection setup message, a physical downlink control channel (PDCCH) for a contention resolution message, or a unicast physical downlink control channel (PDCCH) before a channel state information (CSI) report is transmitted from the UE.

Finally, at 1104, the base station repeats the downlink control channel or does not repeat the downlink control channel based on the indication. For example, with reference to 512, 514, 516 in FIG. 5, the base station 404 may automatically repeat the downlink control channel for the next message of the network access procedure after receiving the indication in the message 510. In other aspects of the disclosure, the base station 404 may determine whether or not to repeat the downlink control channel for the next message of the network access procedure based on one or more conditions defined by the network.

Figure 12:
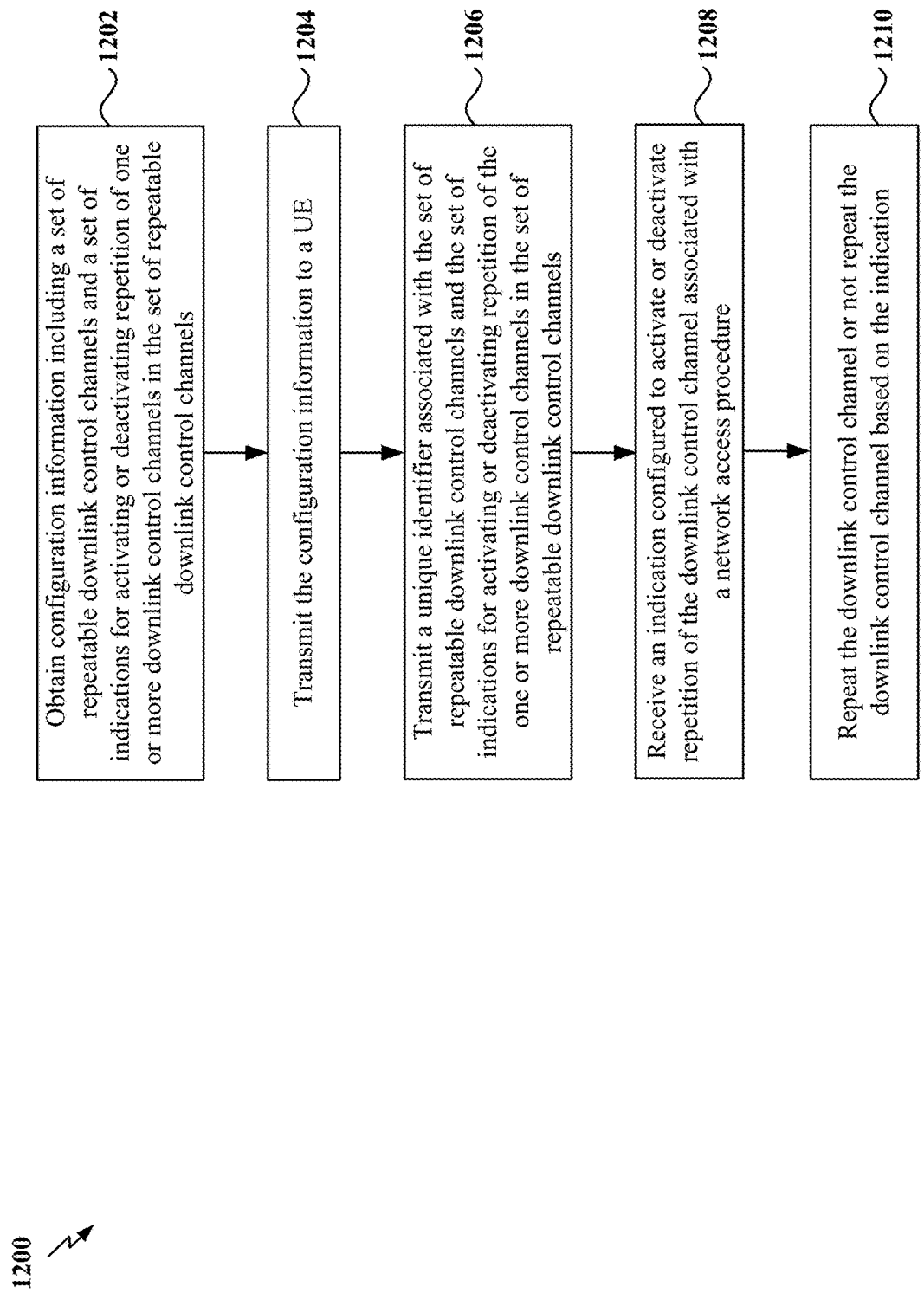
FIG. 12 is a flowchart of a method of wireless communication in accordance with various aspects of the disclosure.

FIG. 12 is a flowchart 1200 of a method of wireless communication. The method may be performed by a base station (e.g., the base station 406; the apparatus 1302/1302'; the processing system 1414, which may include the memory 376 and which may be the entire base station 406 or a component of the base station 406, such as the TX processor 316, the RX processor 370, and/or the controller/processor 375).

At 1202, the base station obtains configuration information including a set of repeatable downlink control channels and a set of indications for activating or deactivating repetition of one or more downlink control channels in the set of repeatable downlink control channels.

For example, with reference to 502 in FIG. 5, the base station 404 may obtain configuration information including a set of indications for activating or deactivating repetition of a set of downlink control channels (also referred to as a set of repeatable downlink control channels). In some examples, the set of indications may include at least one indication for each different downlink control channel in the set of downlink control channels. In some aspects of the disclosure, the set of downlink control channels may be associated with a network access procedure (e.g., the previously described 4-step random access procedure in FIG. 4) that may be performed with the UE 402. In some examples, the configuration information may include the configuration information table 600 previously described with reference to FIG. 6.

In some examples, the set of repeatable downlink control channels includes at least one of a physical downlink control channel (PDCCH) for remaining minimum system information (RMSI), a physical downlink control channel (PDCCH) for a random access response message, a physical downlink control channel (PDCCH) for a retransmission grant of a radio resource connection (RRC) connection setup message, a physical downlink control channel (PDCCH) for a contention resolution message, or a unicast physical downlink control channel (PDCCH) before a channel state information (CSI) report is transmitted from the UE.

In some examples, the set of indications includes at least one of a physical random access channel (PRACH) preamble from a preconfigured subset of PRACH preambles, a PRACH preamble repeated over multiple random access channel (RACH) occasions, a PRACH preamble on a predefined subset of RACH occasions, a PRACH preamble using a designated resource allocation, a request or a predefined message in a radio resource connection (RRC) connection request message, or a first uplink transmission after reception of a contention resolution message.

At 1204, the base station transmits the configuration information to the UE.

At 1206, the base station transmits a unique identifier associated with the set of repeatable downlink control channels and the set of indications for activating or deactivating repetition of the one or more downlink control channels in the set of repeatable downlink control channels. For example, the unique identifier may be one of the unique k-bit identifiers for each row (e.g., first row 610, second row 612, eighth row 614) of the configuration information table 600.

At 1208, the base station receives, from a user equipment (UE), an indication configured to activate or deactivate repetition of the downlink control channel associated with a network access procedure. For example, with reference to FIG. 5, the indication received from the UE may be the selected indication included in message 510, and the network access procedure may be the 4-step random access procedure 400 shown in FIG. 4.

Finally, at 1210, the base station repeats the downlink control channel or does not repeat the downlink control channel based on the indication. For example, with reference to FIG. 5, if the indication (e.g., in the message 510) from the UE 402 includes a PRACH preamble from a preconfigured subset of PRACH preambles, the base station 404 may determine to repeat the PDCCH for the next message of the network access procedure (e.g., for the message 2 (Msg2) 410 of the 4-step random access procedure). Accordingly, the base station 404 may transmit the downlink control channel 514 for the next message of the network access procedure (e.g., for the message 2 (Msg2) 410 of the 4-step random access procedure), followed by a first repetition 516 of the downlink control channel. As shown in FIG. 5, the base station 404 may send up to an Nth repetition 518 of the downlink control channel. In some aspects of the disclosure, the downlink control channel is automatically repeated for a predefined number of repetitions in response to the transmitted indication. In other aspects of the disclosure, the base station 404 may determine whether or not to repeat the downlink control channel for the next message of the network access procedure based on one or more conditions defined by the network.

Figure 13:
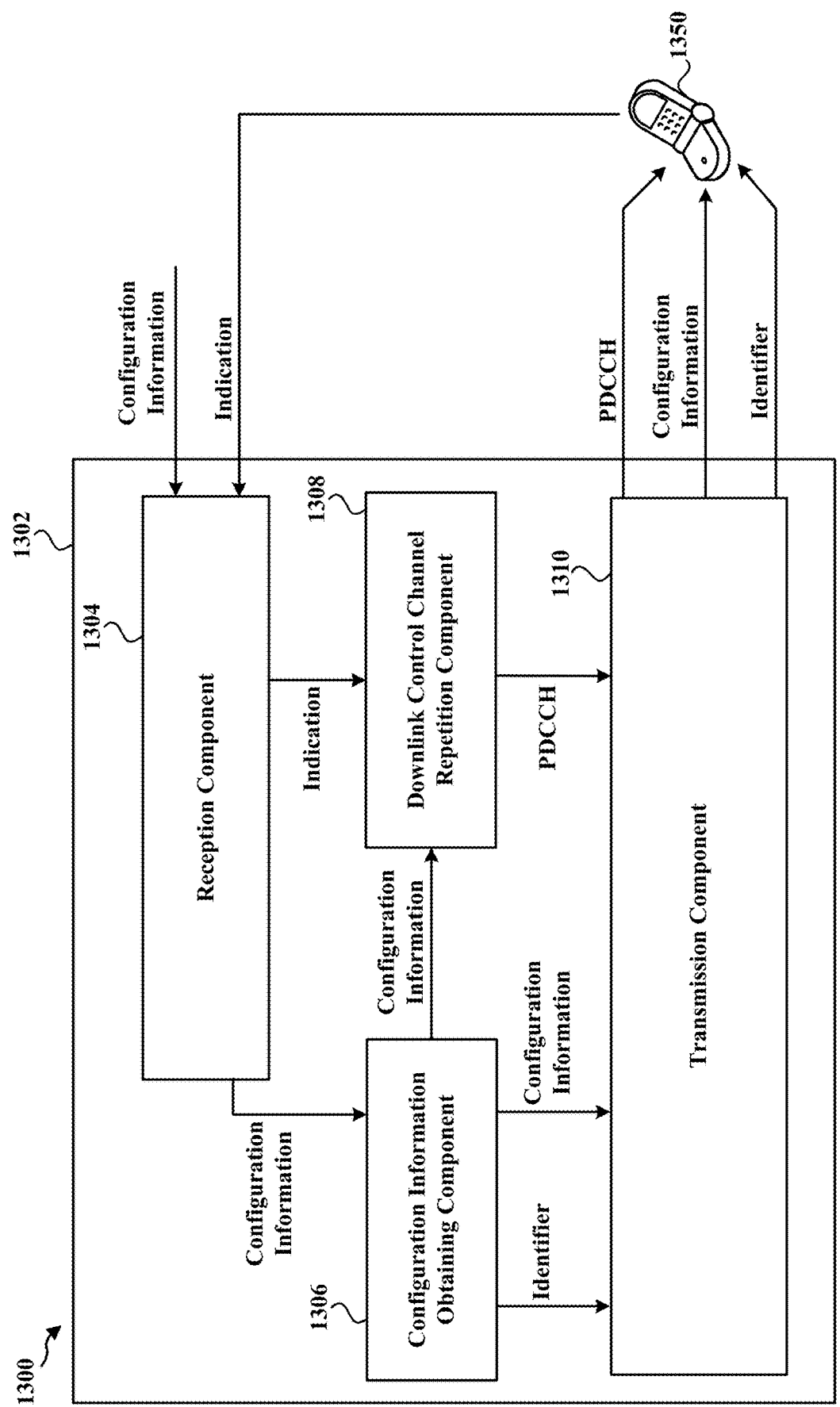
FIG. 13 is a conceptual data flow diagram illustrating the data flow between different means/components in an example apparatus.

FIG. 13 is a conceptual data flow diagram 1300 illustrating the data flow between different means/components in an example apparatus 1302. The apparatus may be a base station.

The apparatus includes a reception component 1304 that receives (e.g., from the UE 1350) an indication configured to activate or deactivate repetition of a downlink control channel associated with a network access procedure. The reception component 1304 may further receive configuration information (e.g., from a network) including a set of repeatable downlink control channels and a set of indications for activating or deactivating repetition of one or more downlink control channels in the set of repeatable downlink control channels.

The apparatus further includes a configuration information obtaining component 1306 that obtains the configuration information including a set of repeatable downlink control channels and a set of indications for activating or deactivating repetition of one or more downlink control channels in the set of repeatable downlink control channels. The configuration information obtaining component 1306 may output a unique identifier associated with the set of repeatable downlink control channels and the set of indications for activating or deactivating repetition of the one or more downlink control channels in the set of repeatable downlink control channels The apparatus further includes a downlink control channel repetition component 1308 that repeats the downlink control channel (e.g., PDCCH for a message of a network access procedure) or does not repeat the downlink control channel based on the indication. In some aspects of the disclosure, the downlink control channel repetition component 1308 may use the indication from the UE 1350 and the configuration information to determine the downlink control channel and to determine whether the downlink control channel is to be repeated.

The apparatus further includes a transmission component 1310 that transmits the configuration information to the UE 1350, transmits a unique identifier associated with the set of repeatable downlink control channels and the set of indications for activating or deactivating repetition of the one or more downlink control channels in the set of repeatable downlink control channels, and transmits the configuration information.

The apparatus may include additional components that perform each of the blocks of the algorithm in the aforementioned flowcharts of FIGS. 11 and 12. As such, each block in the aforementioned flowcharts of FIGS. 11 and 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 14:
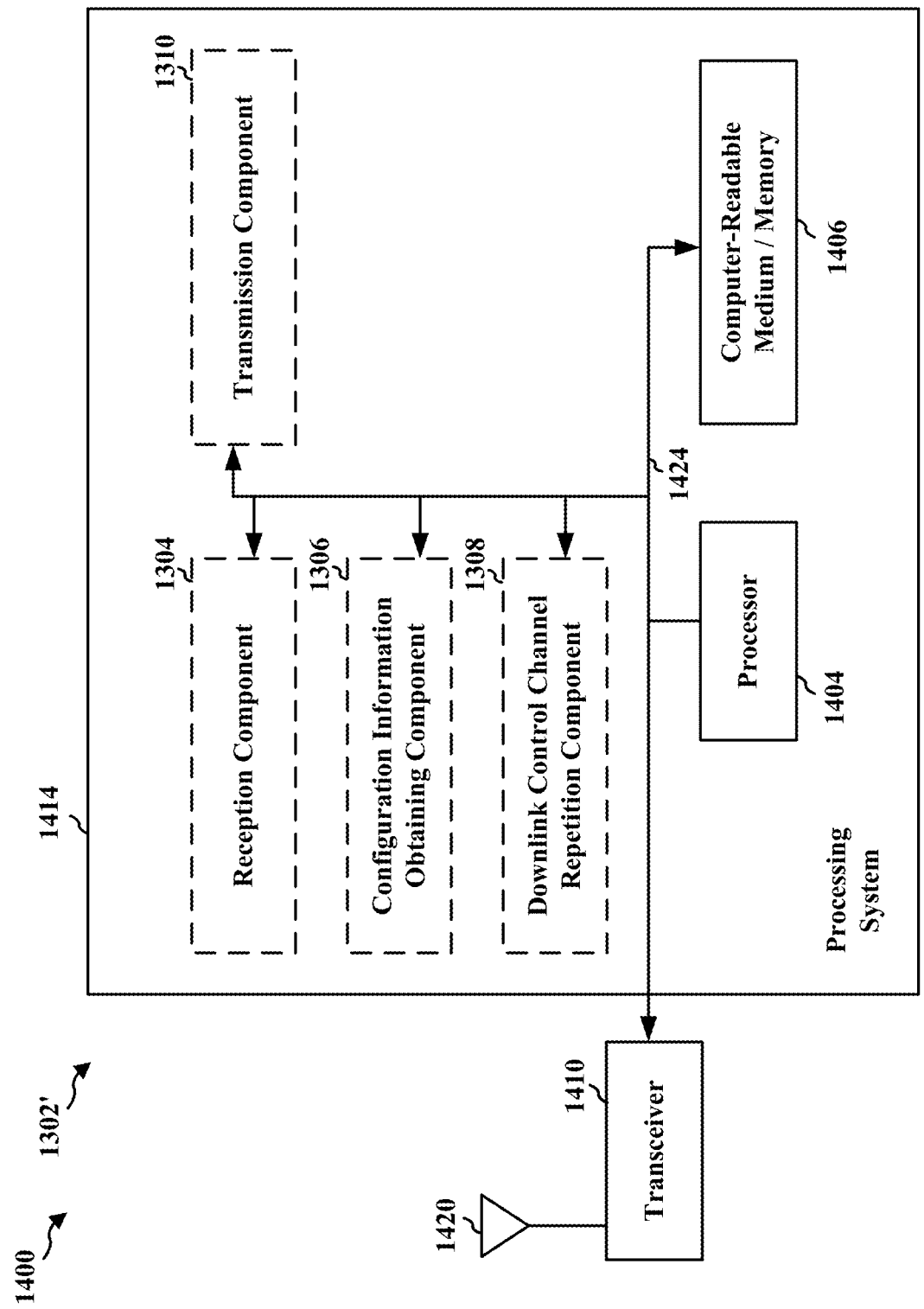
FIG. 14 is a diagram illustrating an example of a hardware implementation for an apparatus employing a processing system.

FIG. 14 is a diagram 1400 illustrating an example of a hardware implementation for an apparatus 1302' employing a processing system 1414. The processing system 1414 may be implemented with a bus architecture, represented generally by the bus 1424. The bus 1424 may include any number of interconnecting buses and bridges depending on the specific application of the processing system 1414 and the overall design constraints. The bus 1424 links together various circuits including one or more processors and/or hardware components, represented by the processor 1404, the components 1304, 1306, 1308, 1310 and the computer-readable medium/memory 1406. The bus 1424 may also link various other circuits such as timing sources, peripherals, voltage regulators, and power management circuits, which are well known in the art, and therefore, will not be described any further.

The processing system 1414 may be coupled to a transceiver 1410. The transceiver 1410 is coupled to one or more antennas 1420. The transceiver 1410 provides a means for communicating with various other apparatus over a transmission medium. The transceiver 1410 receives a signal from the one or more antennas 1420, extracts information from the received signal, and provides the extracted information to the processing system 1414, specifically the reception component 1304. In addition, the transceiver 1410 receives information from the processing system 1414, specifically the transmission component 1310, and based on the received information, generates a signal to be applied to the one or more antennas 1420. The processing system 1414 includes a processor 1404 coupled to a computer-readable medium/memory 1406. The processor 1404 is responsible for general processing, including the execution of software stored on the computer-readable medium/memory 1406. The software, when executed by the processor 1404, causes the processing system 1414 to perform the various functions described supra for any particular apparatus. The computer-readable medium/memory 1406 may also be used for storing data that is manipulated by the processor 1404 when executing software. The processing system 1414 further includes at least one of the components 1304, 1306, 1308, 1310. The components may be software components running in the processor 1404, resident/stored in the computer readable medium/memory 1406, one or more hardware components coupled to the processor 1404, or some combination thereof. The processing system 1414 may be a component of the base station 310 and may include the memory 376 and/or at least one of the TX processor 316, the RX processor 370, and the controller/processor 375. Alternatively, the processing system 1414 may be the entire base station (e.g., see 310 of FIG. 3).

In one configuration, the apparatus 1302/1302' for wireless communication includes means for receiving an indication configured to activate or deactivate repetition of the downlink control channel associated with a network access procedure, means for repeating the downlink control channel or not repeating the downlink control channel based on the indication, means for obtaining configuration information including a set of repeatable downlink control channels and a set of indications for activating or deactivating repetition of one or more downlink control channels in the set of repeatable downlink control channels, means for transmitting the configuration information to the UE, means for transmitting a unique identifier associated with the set of repeatable downlink control channels and the set of indications for activating or deactivating repetition of the one or more downlink control channels in the set of repeatable downlink control channels. The aforementioned means may be one or more of the aforementioned components of the apparatus 1302 and/or the processing system 1414 of the apparatus 1302' configured to perform the functions recited by the aforementioned means. As described supra, the processing system 1414 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Therefore, the aspects described herein may enable a base station to selectively repeat a downlink control channel associated with a message for a network access procedure based on one or more indications received from a UE. Accordingly, the base station may efficiently use network resources to enhance coverage of downlink control channels for different messages of a network access procedure as needed by a UE. Since a UE may activate or deactivate repetition of a downlink control channel using certain messages of a network access procedure (e.g., a physical random access channel (PRACH) preamble from a preconfigured subset of PRACH preambles, a request or a predefined message in a radio resource connection (RRC) connection request message (e.g., message 3 (Msg 3) 412 in FIG. 4), etc.), the aspects described herein may be implemented with low complexity and without a significant increase in signaling overhead.

Broadcast PDCCHs for some messages, however, may need less repetition (e.g., due to an additional enhancement or required resources) than broadcast PDCCHs for other messages. The aspects described herein may enable a base station to It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The following provides an overview of aspects of the present disclosure:

Example 1: A method of wireless communication for a user equipment (UE), comprising: determining, at the UE, to activate or deactivate repetition of a downlink control channel associated with a network access procedure; and transmitting an indication configured to activate or deactivate repetition of the downlink control channel.

Example 2: The method of example 1, wherein the determining to activate or deactivate repetition of the downlink control channel comprises: obtaining configuration information including a set of repeatable downlink control channels and a set of indications for activating or deactivating repetition of one or more downlink control channels in the set of repeatable downlink control channels; selecting the downlink control channel from the set of repeatable downlink control channels; and selecting the indication configured to activate or deactivate repetition of the downlink control channel from the set of indications.

Example 3: The method of example 2, wherein the set of repeatable downlink control channels includes at least one of a physical downlink control channel (PDCCH) for remaining minimum system information (RMSI), a physical downlink control channel (PDCCH) for a random access response message, a physical downlink control channel (PDCCH) for a retransmission grant of a radio resource connection (RRC) connection setup message, a physical downlink control channel (PDCCH) for a contention resolution message, or a unicast physical downlink control channel (PDCCH) before a channel state information (CSI) report is transmitted from the UE.

Example 4: The method of example 2 or 3, wherein the set of indications includes at least one of a physical random access channel (PRACH) preamble from a preconfigured subset of PRACH preambles, a PRACH preamble repeated over multiple random access channel (RACH) occasions, a PRACH preamble on a predefined subset of RACH occasions, a PRACH preamble using a designated resource allocation, a request or a predefined message in a radio resource connection (RRC) connection request message, or a first uplink transmission after reception of a contention resolution message.

Example 5: The method of example 4, wherein the predefined message includes a beam report, and wherein the predefined message is configured to deactivate repetition of the downlink control channel.

Example 6: The method of any of examples 2 through 4, further comprising: receiving a unique identifier associated with the set of repeatable downlink control channels and the set of indications for activating or deactivating repetition of the one or more downlink control channels in the set of repeatable downlink control channels.

Example 7: The method of any of examples 2 through 6, wherein the configuration information includes at least one rule for controlling repetition of the downlink control channel.

Example 8: The method of any of examples 1 through 7, wherein the downlink control channel is automatically repeated for a predefined number of repetitions in response to the transmitted indication.

Example 9: The method of any of examples 1 through 8, further comprising: performing a first blind decoding operation for the downlink control channel based on an assumption that the downlink control channel will not be repeated; and performing a second blind decoding operation for the downlink control channel based on an assumption that the downlink control channel will be repeated.

Example 10: The method of examples 1 through 9, wherein the indication is configured to activate or deactivate repetition of the downlink control channel for one or more subsequent messages of the network access procedure from the base station.

Example 11: An apparatus for wireless communication, comprising: a memory; and at least one processor coupled to the memory and configured to perform a method of any one of examples of 1 through 10.

Example 12: A method of wireless communication for a base station, comprising: receiving, from a user equipment (UE), an indication configured to activate or deactivate repetition of the downlink control channel associated with a network access procedure; and repeating the downlink control channel or not repeating the downlink control channel based on the indication.

Example 13: The method of example 12, further comprising: obtaining configuration information including a set of repeatable downlink control channels and a set of indications for activating or deactivating repetition of one or more downlink control channels in the set of repeatable downlink control channels; and transmitting the configuration information to the UE.

Example 14: The method of example 13, wherein the set of repeatable downlink control channels includes at least one of a physical downlink control channel (PDCCH) for remaining minimum system information (RMSI), a physical downlink control channel (PDCCH) for a random access response message, a physical downlink control channel (PDCCH) for a retransmission grant of a radio resource connection (RRC) connection setup message, a physical downlink control channel (PDCCH) for a contention resolution message, or a unicast physical downlink control channel (PDCCH) before a channel state information (CSI) report is transmitted from the UE.

Example 15: The method of example 13 or 14, wherein the set of indications includes at least one of a physical random access channel (PRACH) preamble from a preconfigured subset of PRACH preambles, a PRACH preamble repeated over multiple random access channel (RACH) occasions, a PRACH preamble on a predefined subset of RACH occasions, a PRACH preamble using a designated resource allocation, a request or a predefined message in a radio resource connection (RRC) connection request message, or a first uplink transmission after reception of a contention resolution message.

Example 16: The method of example 15, wherein the predefined message includes a beam report, and wherein the predefined message is configured to deactivate repetition of the downlink control channel.

Example 17: The method of any of examples 14 through 16, further comprising: transmitting a unique identifier associated with the set of repeatable downlink control channels and the set of indications for activating or deactivating repetition of the one or more downlink control channels in the set of repeatable downlink control channels.

Example 18: The method of any of examples 13 through 17, wherein the configuration information includes at least one rule for controlling repetition of the downlink control channel.

Example 19: The method of any of examples 12 through 18, wherein the downlink control channel is automatically repeated for a predefined number of repetitions in response to the transmitted indication.

Example 20: The method of any of examples 12 through 18, wherein the downlink control channel is repeated or not repeated for one or more subsequent messages of the network access procedure.

Example 21: An apparatus for wireless communication, comprising: a memory; and at least one processor coupled to the memory and configured to perform a method of any one of examples of 12 through 20.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication for a user equipment (UE), comprising:
   determining, at the UE, to activate or deactivate repetition of a downlink control channel associated with a network access procedure; and
   transmitting an indication configured to activate or deactivate repetition of the downlink control channel.

2. The method of claim 1, wherein the determining to activate or deactivate repetition of the downlink control channel comprises:
   obtaining configuration information including a set of repeatable downlink control channels and a set of indications for activating or deactivating repetition of one or more downlink control channels in the set of repeatable downlink control channels;
   selecting the downlink control channel from the set of repeatable downlink control channels; and
   selecting the indication configured to activate or deactivate repetition of the downlink control channel from the set of indications.

3. The method of claim 2, wherein the set of repeatable downlink control channels includes at least one of a physical downlink control channel (PDCCH) for remaining minimum system information (RMSI), a physical downlink control channel (PDCCH) for a random access response message, a physical downlink control channel (PDCCH) for a retransmission grant of a radio resource connection (RRC) connection setup message, a physical downlink control channel (PDCCH) for a contention resolution message, or a unicast physical downlink control channel (PDCCH) before a channel state information (CSI) report is transmitted from the UE.

4. The method of claim 2, wherein the set of indications includes at least one of a physical random access channel (PRACH) preamble from a preconfigured subset of PRACH preambles, a PRACH preamble repeated over multiple random access channel (RACH) occasions, a PRACH preamble on a predefined subset of RACH occasions, a PRACH preamble using a designated resource allocation, a request or a predefined message in a radio resource connection (RRC) connection request message, or a first uplink transmission after reception of a contention resolution message.

5. The method of claim 4, wherein the predefined message includes a beam report, and wherein the predefined message is configured to deactivate repetition of the downlink control channel.

6. The method of claim 2, further comprising:
   receiving a unique identifier associated with the set of repeatable downlink control channels and the set of indications for activating or deactivating repetition of the one or more downlink control channels in the set of repeatable downlink control channels.

7. The method of claim 2, wherein the configuration information includes at least one rule for controlling repetition of the downlink control channel.

8. The method of claim 1, wherein the downlink control channel is automatically repeated for a predefined number of repetitions in response to the transmitted indication.

9. The method of claim 1, further comprising:
   performing a first blind decoding operation for the downlink control channel based on an assumption that the downlink control channel will not be repeated; and
   performing a second blind decoding operation for the downlink control channel based on an assumption that the downlink control channel will be repeated.

10. The method of claim 1, wherein the indication is configured to activate or deactivate repetition of the downlink control channel for one or more subsequent messages of the network access procedure from the base station.

11. An apparatus for wireless communication, comprising:
    a memory; and
    at least one processor coupled to the memory and configured to:
      determine to activate or deactivate repetition of a downlink control channel associated with a network access procedure; and
      transmit an indication configured to activate or deactivate repetition of the downlink control channel.

12. The apparatus of claim 11, wherein the at least one processor configured to determine to activate or deactivate repetition of the downlink control channel associated with the network access procedure is further configured to:
    determine to activate or deactivate repetition of the downlink control channel comprises:
    obtain configuration information including a set of repeatable downlink control channels and a set of indications for activating or deactivating repetition of one or more downlink control channels in the set of repeatable downlink control channels;
    select the downlink control channel from the set of repeatable downlink control channels; and
    select the indication configured to activate or deactivate repetition of the downlink control channel from the set of indications.

13. The apparatus of claim 12, wherein the set of repeatable downlink control channels includes at least one of a physical downlink control channel (PDCCH) for remaining minimum system information (RMSI), a physical downlink control channel (PDCCH) for a random access response message, a physical downlink control channel (PDCCH) for a retransmission grant of a radio resource connection (RRC) connection setup message, a physical downlink control channel (PDCCH) for a contention resolution message, or a unicast physical downlink control channel (PDCCH) before a channel state information (CSI) report is transmitted from the UE.

14. The apparatus of claim 12, wherein the set of indications includes at least one of a physical random access channel (PRACH) preamble from a preconfigured subset of PRACH preambles, a PRACH preamble repeated over multiple random access channel (RACH) occasions, a PRACH preamble on a predefined subset of RACH occasions, a PRACH preamble using a designated resource allocation, a request or a predefined message in a radio resource connection (RRC) connection request message, or a first uplink transmission after reception of a contention resolution message.

15. The apparatus of claim 12, wherein the at least one processor is further configured to:
    receive a unique identifier associated with the set of repeatable downlink control channels and the set of indications for activating or deactivating repetition of the one or more downlink control channels in the set of repeatable downlink control channels.

16. The apparatus of claim 11, wherein the at least one processor is further configured to:
perform a first blind decoding operation for the downlink control channel based on an assumption that the downlink control channel will not be repeated; and
perform a second blind decoding operation for the downlink control channel based on an assumption that the downlink control channel will be repeated.

17. A method of wireless communication for a base station, comprising:
receiving, from a user equipment (UE), an indication configured to activate or deactivate repetition of the downlink control channel associated with a network access procedure; and
repeating the downlink control channel or not repeating the downlink control channel based on the indication.

18. The method of claim 17, further comprising:
obtaining configuration information including a set of repeatable downlink control channels and a set of indications for activating or deactivating repetition of one or more downlink control channels in the set of repeatable downlink control channels; and
transmitting the configuration information to the UE.

19. The method of claim 18, wherein the set of repeatable downlink control channels includes at least one of a physical downlink control channel (PDCCH) for remaining minimum system information (RMSI), a physical downlink control channel (PDCCH) for a random access response message, a physical downlink control channel (PDCCH) for a retransmission grant of a radio resource connection (RRC) connection setup message, a physical downlink control channel (PDCCH) for a contention resolution message, or a unicast physical downlink control channel (PDCCH) before a channel state information (CSI) report is transmitted from the UE.

20. The method of claim 18, wherein the set of indications includes at least one of a physical random access channel (PRACH) preamble from a preconfigured subset of PRACH preambles, a PRACH preamble repeated over multiple random access channel (RACH) occasions, a PRACH preamble on a predefined subset of RACH occasions, a PRACH preamble using a designated resource allocation, a request or a predefined message in a radio resource connection (RRC) connection request message, or a first uplink transmission after reception of a contention resolution message.

21. The method of claim 20, wherein the predefined message includes a beam report, and wherein the predefined message is configured to deactivate repetition of the downlink control channel.

22. The method of claim 18, further comprising:
transmitting a unique identifier associated with the set of repeatable downlink control channels and the set of indications for activating or deactivating repetition of the one or more downlink control channels in the set of repeatable downlink control channels.

23. The method of claim 18, wherein the configuration information includes at least one rule for controlling repetition of the downlink control channel.

24. The method of claim 17, wherein the downlink control channel is automatically repeated for a predefined number of repetitions in response to the transmitted indication.

25. The method of claim 17, wherein the downlink control channel is repeated or not repeated for one or more subsequent messages of the network access procedure.

26. An apparatus for wireless communication, comprising:
a memory; and
at least one processor coupled to the memory and configured to:
receive, from a user equipment (UE), an indication configured to activate or deactivate repetition of the downlink control channel associated with a network access procedure; and
repeat the downlink control channel or not repeat the downlink control channel based on the indication.

27. The apparatus of claim 26, wherein the at least one processor is further configured to:
obtain configuration information including a set of repeatable downlink control channels and a set of indications for activating or deactivating repetition of one or more downlink control channels in the set of repeatable downlink control channels; and
transmit the configuration information to the UE.

28. The apparatus of claim 27, wherein the set of repeatable downlink control channels includes at least one of a physical downlink control channel (PDCCH) for remaining minimum system information (RMSI), a physical downlink control channel (PDCCH) for a random access response message, a physical downlink control channel (PDCCH) for a retransmission grant of a radio resource connection (RRC) connection setup message, a physical downlink control channel (PDCCH) for a contention resolution message, or a unicast physical downlink control channel (PDCCH) before a channel state information (CSI) report is transmitted from the UE.

29. The apparatus of claim 27, wherein the set of indications includes at least one of a physical random access channel (PRACH) preamble from a preconfigured subset of PRACH preambles, a PRACH preamble repeated over multiple random access channel (RACH) occasions, a PRACH preamble on a predefined subset of RACH occasions, a PRACH preamble using a designated resource allocation, a request or a predefined message in a radio resource connection (RRC) connection request message, or a first uplink transmission after reception of a contention resolution message.

30. The apparatus of claim 27, wherein the at least one processor is further configured to:
transmit a unique identifier associated with the set of repeatable downlink control channels and the set of indications for activating or deactivating repetition of the one or more downlink control channels in the set of repeatable downlink control channels.

* * * * *